(12) United States Patent
Schlossberg et al.

(10) Patent No.: US 9,616,335 B2
(45) Date of Patent: Apr. 11, 2017

(54) GAME SYSTEM WITH INTERACTIVE SHOW CONTROL

(71) Applicant: Eddie's Social Club, LLC, New York, NY (US)

(72) Inventors: Edwin Schlossberg, New York, NY (US); Jeremiah Harris, Greenwich, CT (US)

(73) Assignee: Eddie's Social Club, LLC, New York, NY (US)

( * ) Notice: Subject to any disclaimer, the term of this patent is extended or adjusted under 35 U.S.C. 154(b) by 0 days.

(21) Appl. No.: 14/710,863

(22) Filed: May 13, 2015

(65) Prior Publication Data

US 2015/0321090 A1 Nov. 12, 2015

Related U.S. Application Data

(60) Division of application No. 14/559,625, filed on Dec. 3, 2014, which is a continuation-in-part of application No. 14/167,011, filed on Jan. 29, 2014.

(Continued)

(51) Int. Cl.

| A63F 9/24 | (2006.01) |
|---|---|
| A63F 13/235 | (2014.01) |
| A63F 13/27 | (2014.01) |
| A63F 13/67 | (2014.01) |
| A63F 13/25 | (2014.01) |
| F21V 23/04 | (2006.01) |
| A63J 11/00 | (2006.01) |
| A63F 13/216 | (2014.01) |
| A63F 13/28 | (2014.01) |
| A63F 13/54 | (2014.01) |
| A63F 13/65 | (2014.01) |
| A63F 13/795 | (2014.01) |

(Continued)

(52) U.S. Cl.
CPC .......... *A63F 13/235* (2014.09); *A63F 13/216* (2014.09); *A63F 13/25* (2014.09); *A63F 13/27* (2014.09); *A63F 13/28* (2014.09); *A63F 13/54* (2014.09); *A63F 13/65* (2014.09); *A63F 13/67* (2014.09); *A63F 13/795* (2014.09); *A63J 11/00* (2013.01); *F21V 23/045* (2013.01); *F21V 23/0442* (2013.01); *G06F 3/0488* (2013.01); *G06F 3/04812* (2013.01); *A63F 13/33* (2014.09); *A63F 13/35* (2014.09); *F21V 23/0471* (2013.01); *F21V 23/0478* (2013.01)

(58) Field of Classification Search
CPC A63F 13/27; A63F 13/35; A63F 13/65; A63J 11/00; F21V 23/045; F21V 23/0442; F21V 23/0471; F21V 23/0478
USPC .......................................................... 446/175
See application file for complete search history.

(56) References Cited

U.S. PATENT DOCUMENTS

| 5,795,228 A | 8/1998 | Trumbull et al. |
|---|---|---|
| 6,166,496 A | 12/2000 | Lys et al. |
| 6,769,790 B2 | 8/2004 | Fruhm et al. |
| 6,891,656 B2 | 5/2005 | Hunt |

(Continued)

*Primary Examiner* — William H McCulloch, Jr.
*Assistant Examiner* — Chase Leichliter
(74) *Attorney, Agent, or Firm* — Law Office of Scott C Harris, Inc

(57) ABSTRACT

An interactive game system that stage lighting style cues as part of the game, where the stage lighting cues cause external stage lighting equipment to create effects that are based on outputs from the game. Steerable lights can be steered to the player and sounds can be created that are directed to the player. A simulation system can also simulate the actions that occur. The computer assigns teams.

21 Claims, 12 Drawing Sheets

Related U.S. Application Data

(60) Provisional application No. 61/757,964, filed on Jan. 29, 2013.

(51) Int. Cl.
*G06F 3/0481* (2013.01)
*G06F 3/0488* (2013.01)
*A63F 13/35* (2014.01)
*A63F 13/33* (2014.01)

(56) References Cited

U.S. PATENT DOCUMENTS

| | | | |
|---|---|---|---|
| 7,775,883 B2 | 8/2010 | Smoot et al. | |
| 2002/0149940 A1* | 10/2002 | Fruhm | F21S 2/00 362/286 |
| 2003/0057884 A1 | 3/2003 | Dowling et al. | |
| 2004/0092311 A1 | 5/2004 | Weston et al. | |
| 2004/0102247 A1 | 5/2004 | Smoot et al. | |
| 2004/0183775 A1 | 9/2004 | Bell | |
| 2006/0068917 A1* | 3/2006 | Snoddy | A63F 13/31 463/42 |
| 2006/0072076 A1 | 4/2006 | Smoot et al. | |
| 2010/0267448 A1* | 10/2010 | Snoddy | A63F 13/31 463/30 |
| 2012/0004031 A1* | 1/2012 | Barney | A63F 13/235 463/31 |
| 2012/0174145 A1* | 7/2012 | Frazier | H04H 60/33 725/14 |
| 2015/0209666 A1 | 7/2015 | Harris et al. | |
| 2015/0297996 A1 | 10/2015 | Konkle | |
| 2015/0301715 A1 | 10/2015 | Schlossberg et al. | |

\* cited by examiner

GAME SYSTEM WITH INTERACTIVE SHOW CONTROL

This is a divisional of application Ser. No. 14/559,625, filed Dec. 3, 2014, which was a continuation in part of Ser. No. 14/167,011, filed 29 Jan. 2014, which claims priority from 61/757,964, filed Jan. 29, 2013, the entire contents of all of which are herewith incorporated by reference.

BACKGROUND

Today's game systems typically run on a computer platform. The computer can run the games, and also produces outputs to interact with the players, and receives inputs from those players. For example, the gaming system operates by automatically interacting with the players and producing sounds.

SUMMARY

The present application describes a game system that uses a number of servers that each interact with one another, and can automatically interact with multiple different external devices.

The device interacts with show control devices, e.g., stage lighting, as part of a game system. This enables lighting effects to be created in a room that are controlled by and synchronized with the game.

Another aspect describes player controlled and/or synchronized show control based on actions in an interactive game.

Another aspect describes an emulator that emulates not only actions in the game, but also in the room housing the game.

Embodiments describe the way that events and states are sent between computers in a way that maintains the synchronization between the computers. Another aspect of this allows this to be done in the context of an interactive game, and indicates how the players can enter the game via events and states.

Another embodiment describes more detail about how player positions are monitored and maintained and tracked. One aspect of this embodiment describes a game system where the game starts when users are properly in place

Figure 1:
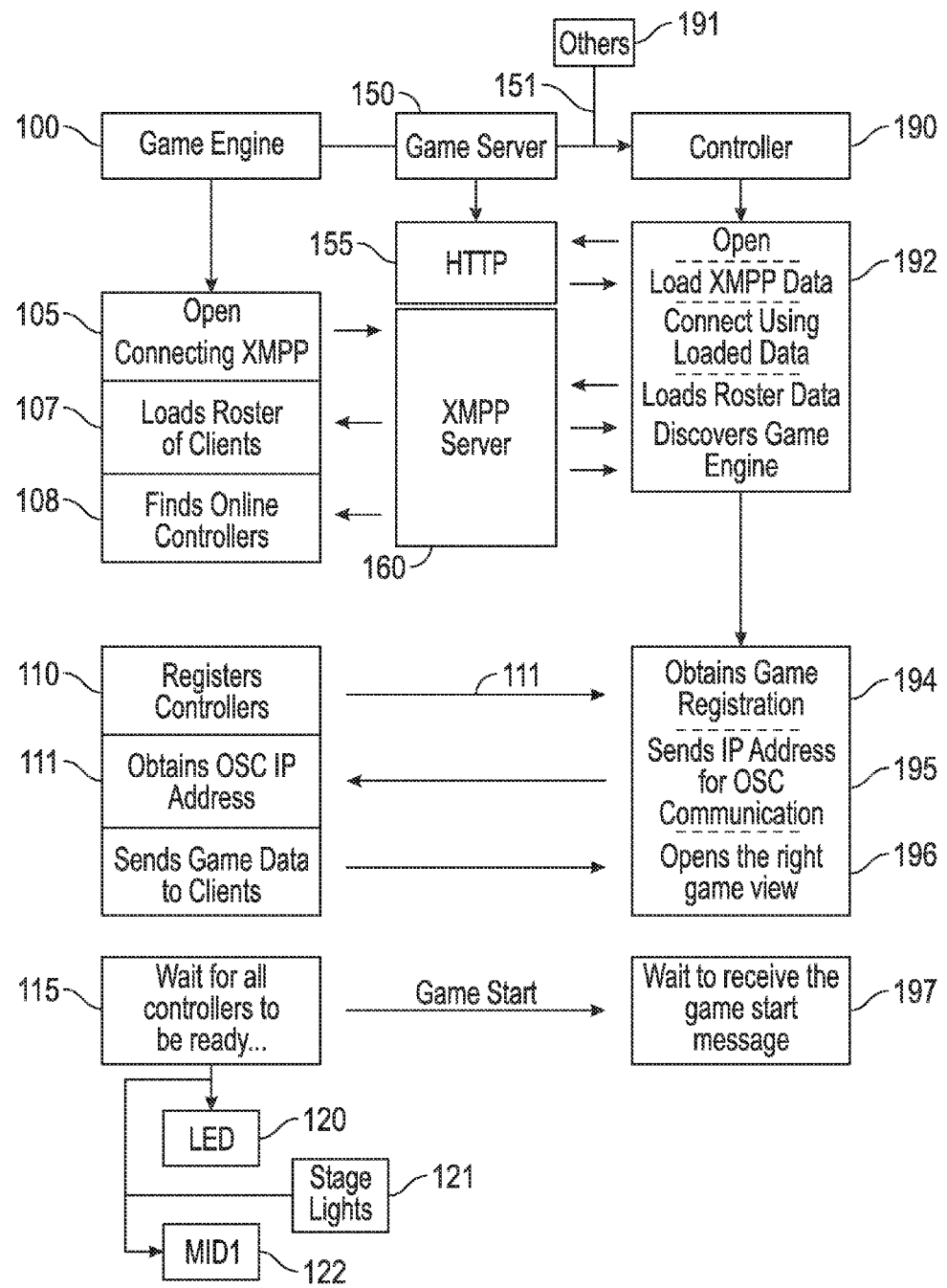
Figure 2:
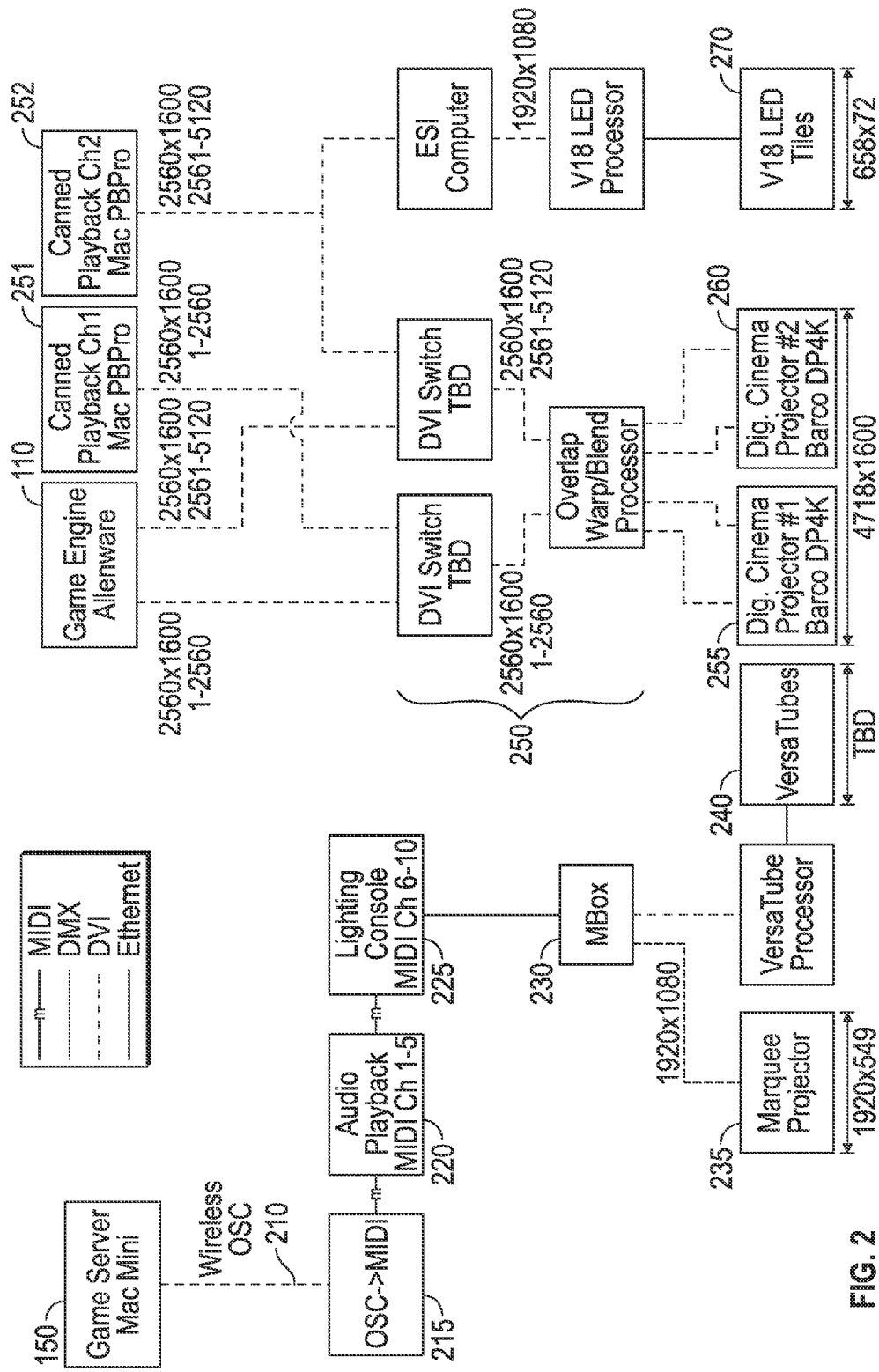
Figure 3:
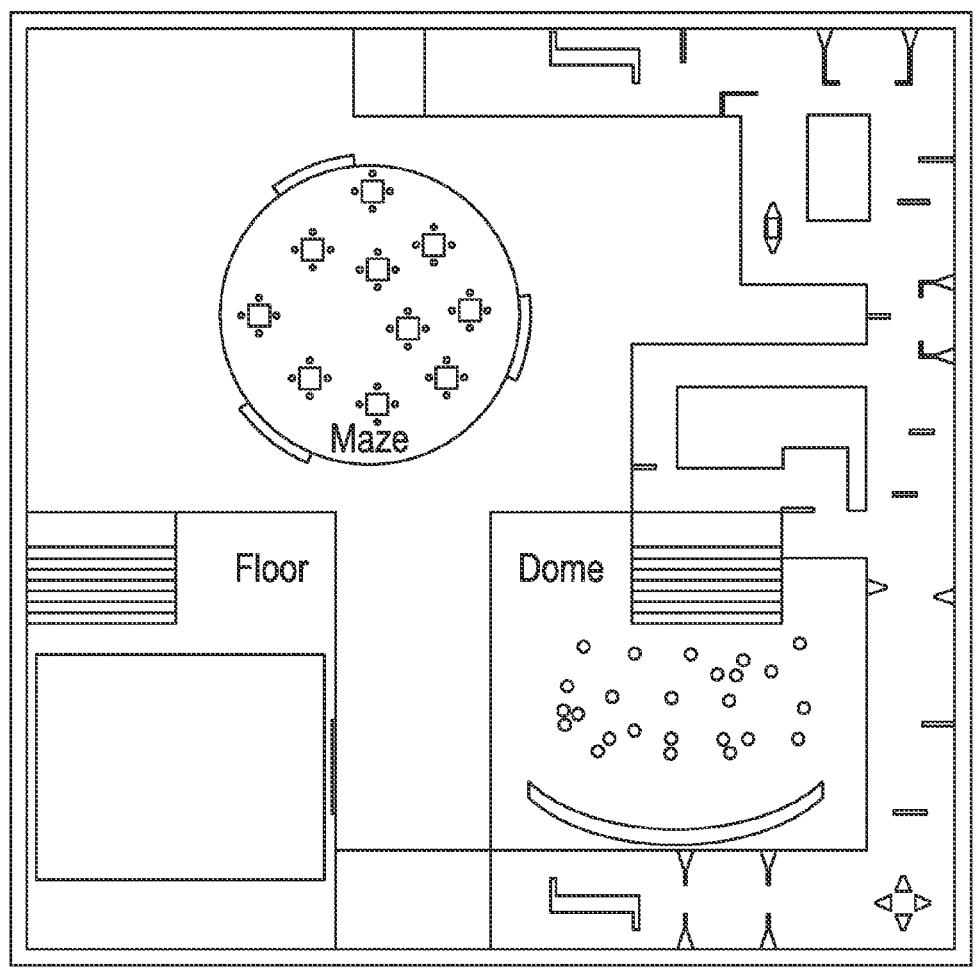
Figure 4:
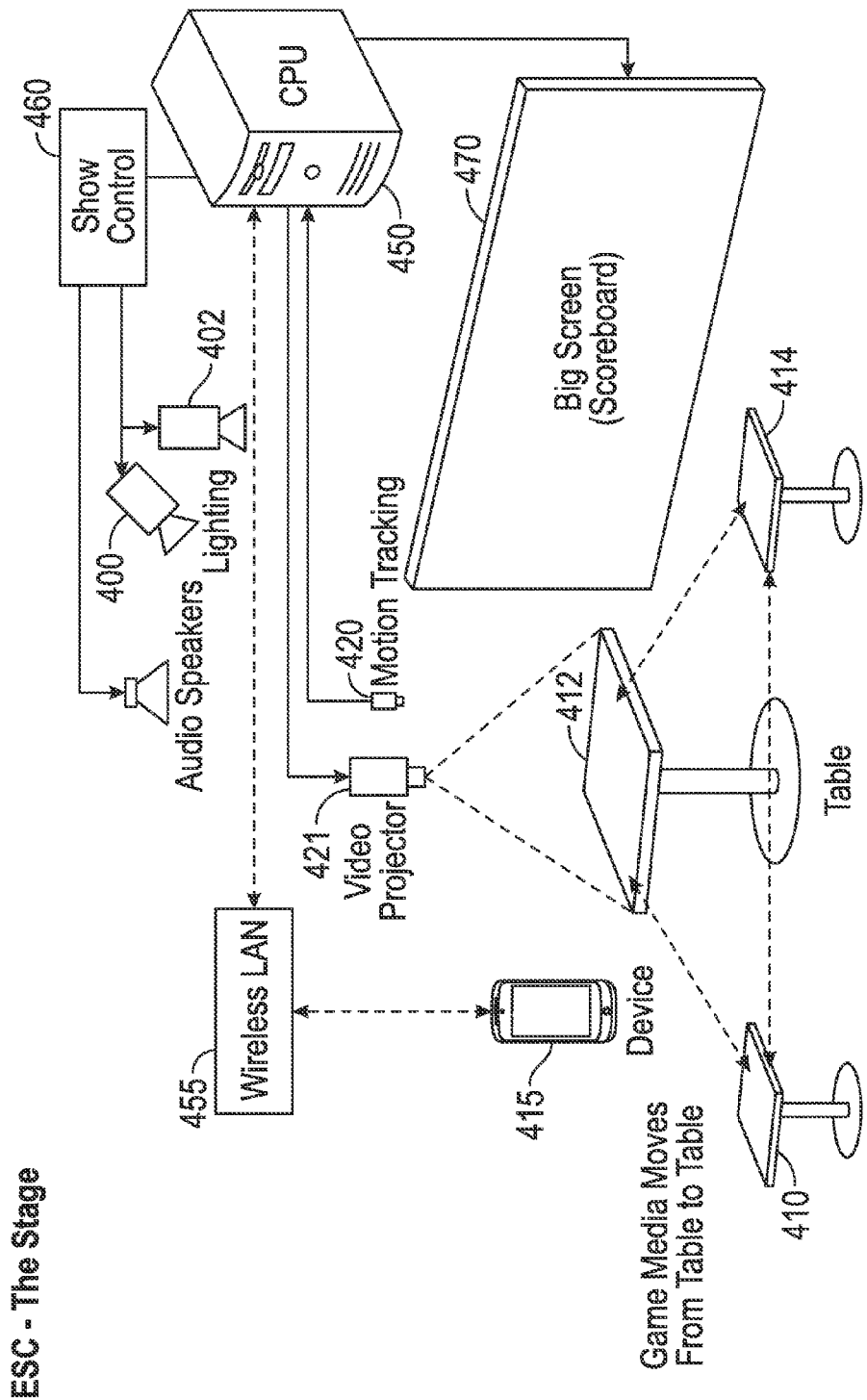
Figure 5:
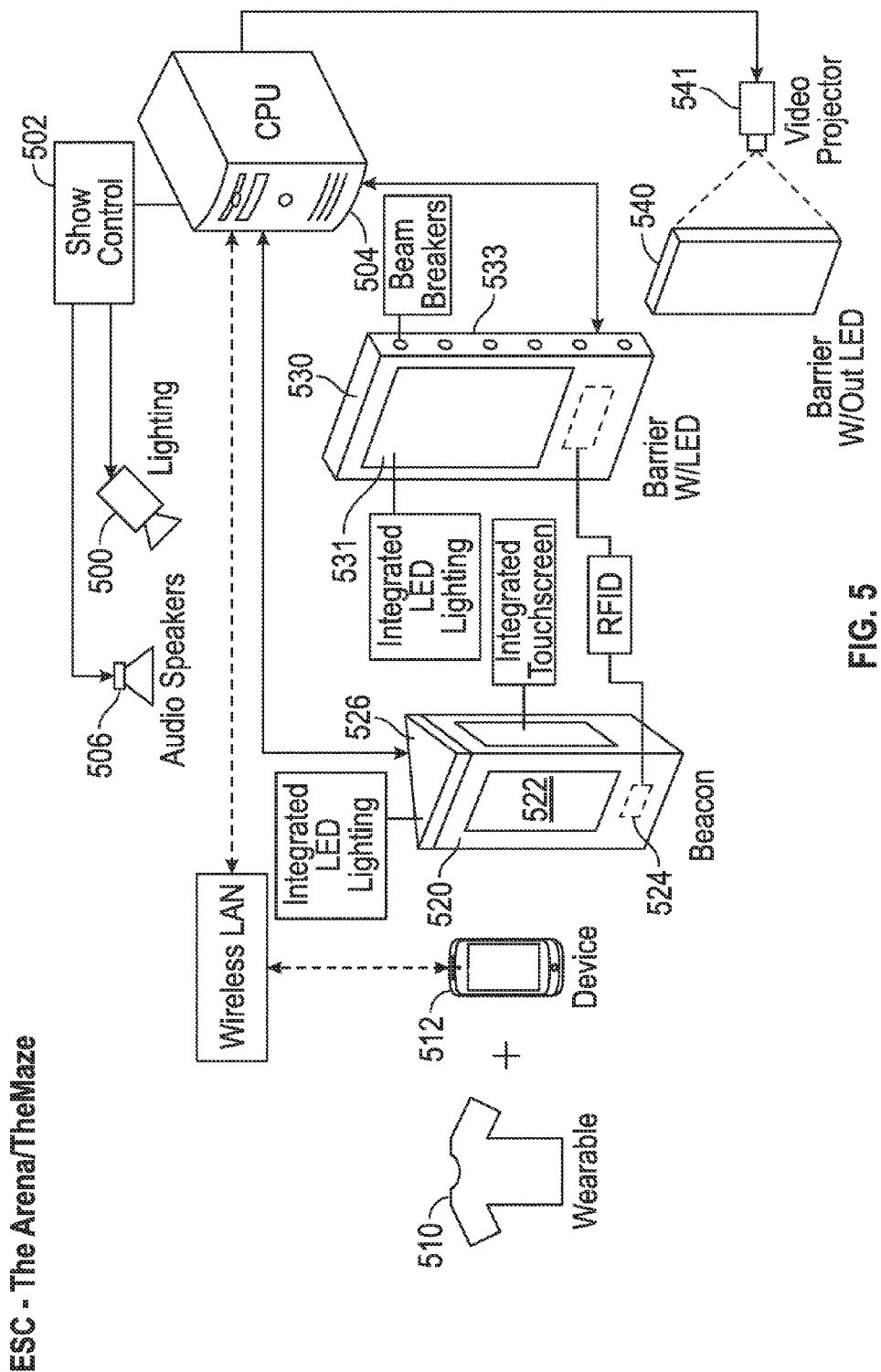
Figure 6:
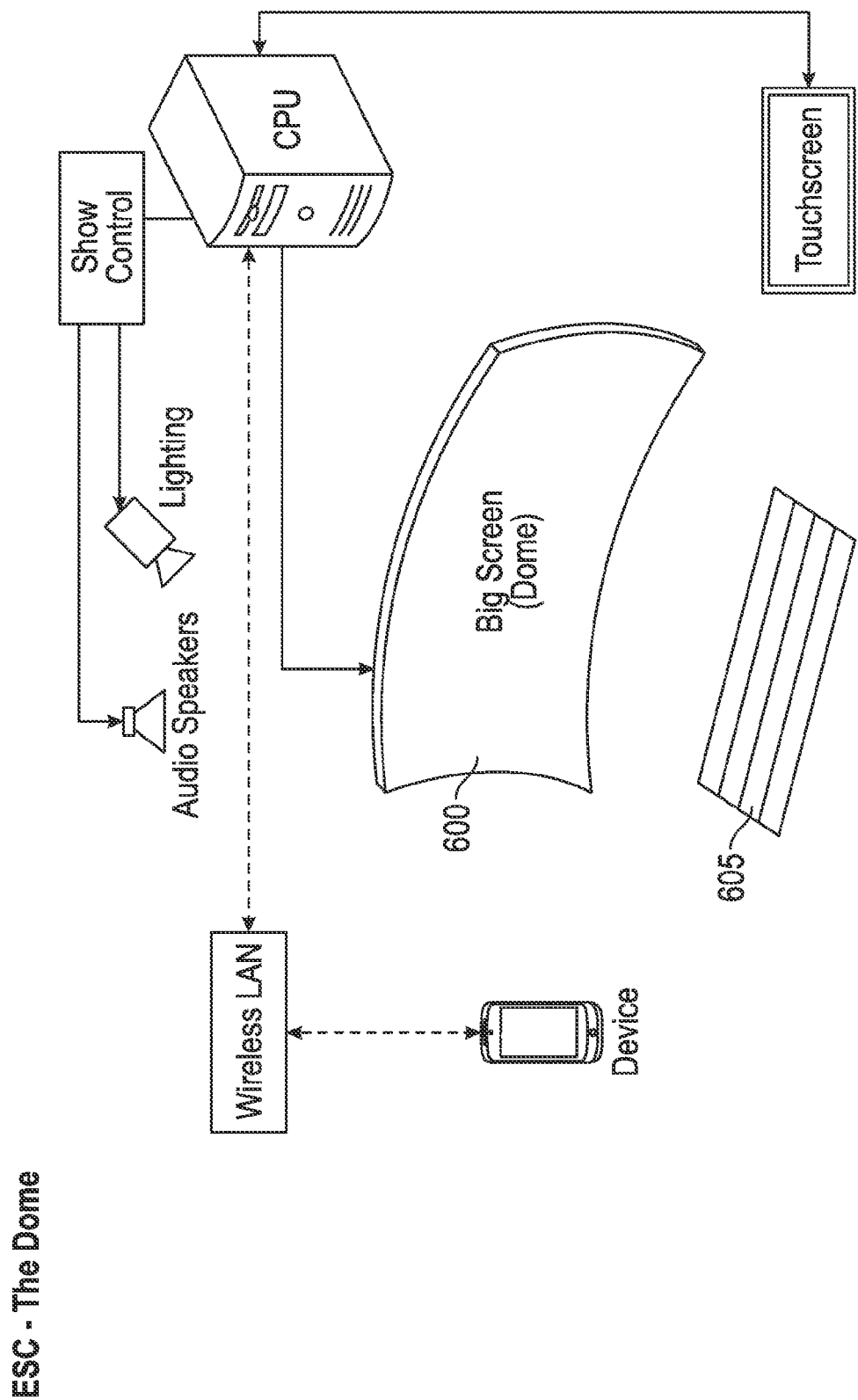
Figure 7:
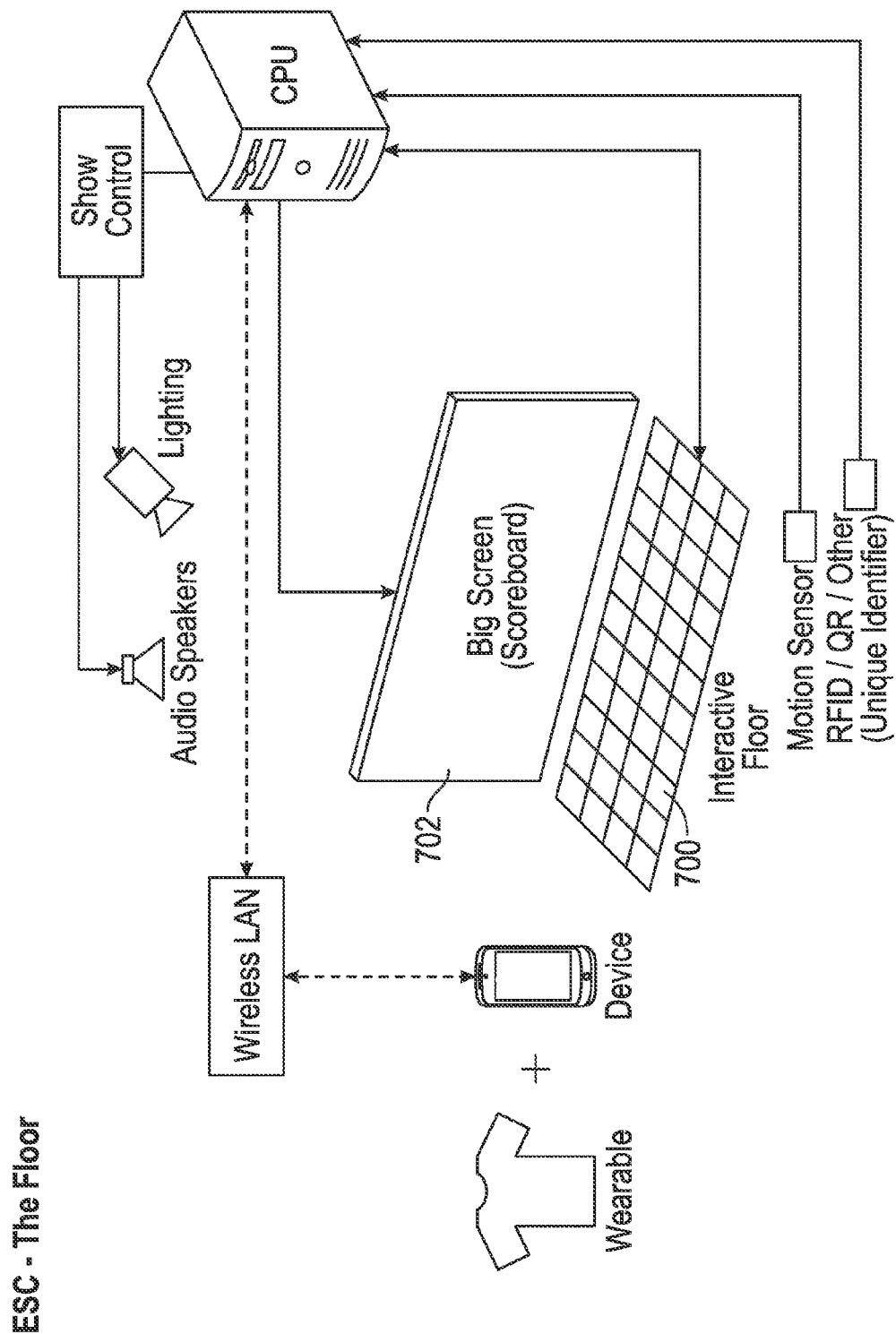
Figure 8:
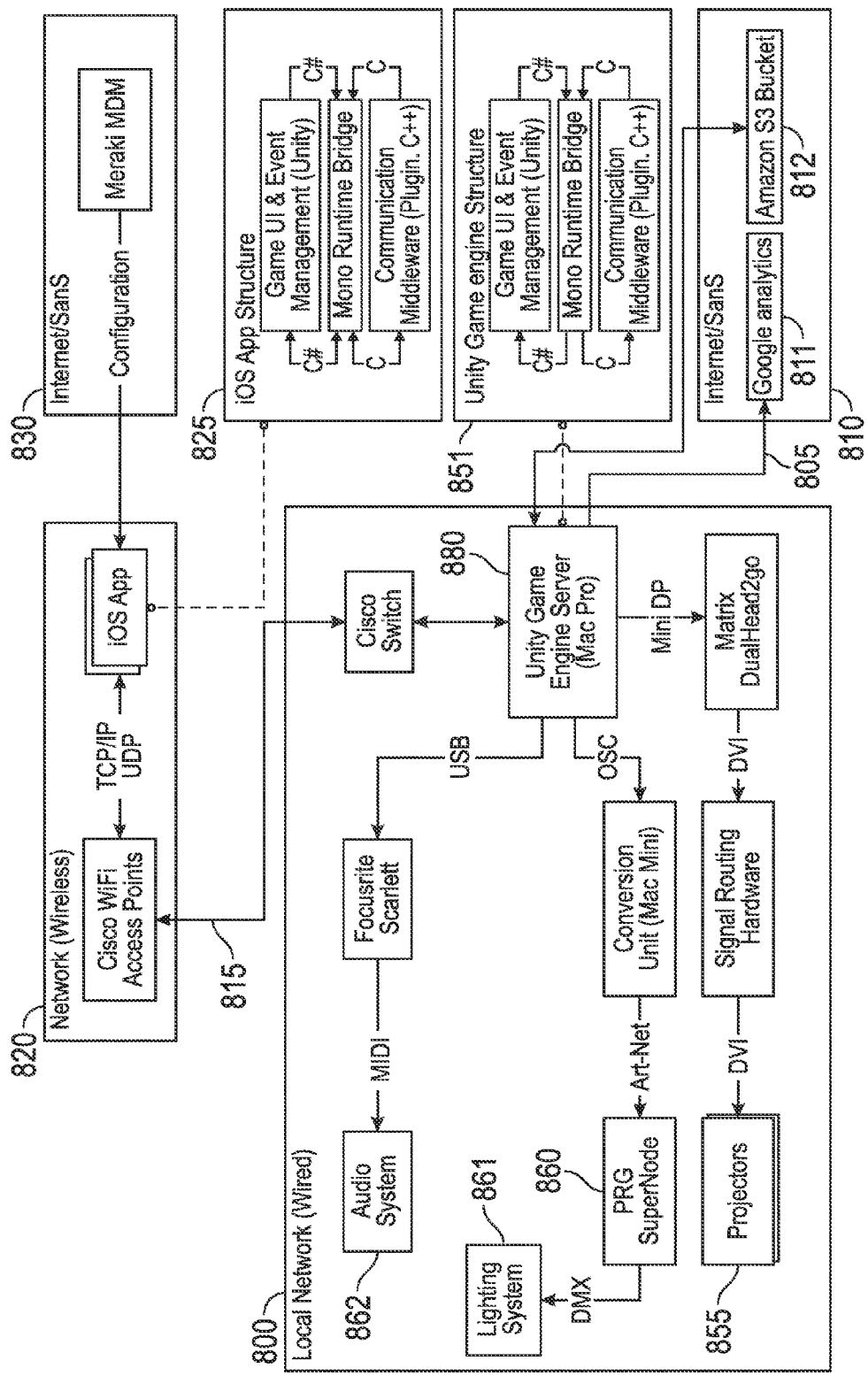
Figure 9:
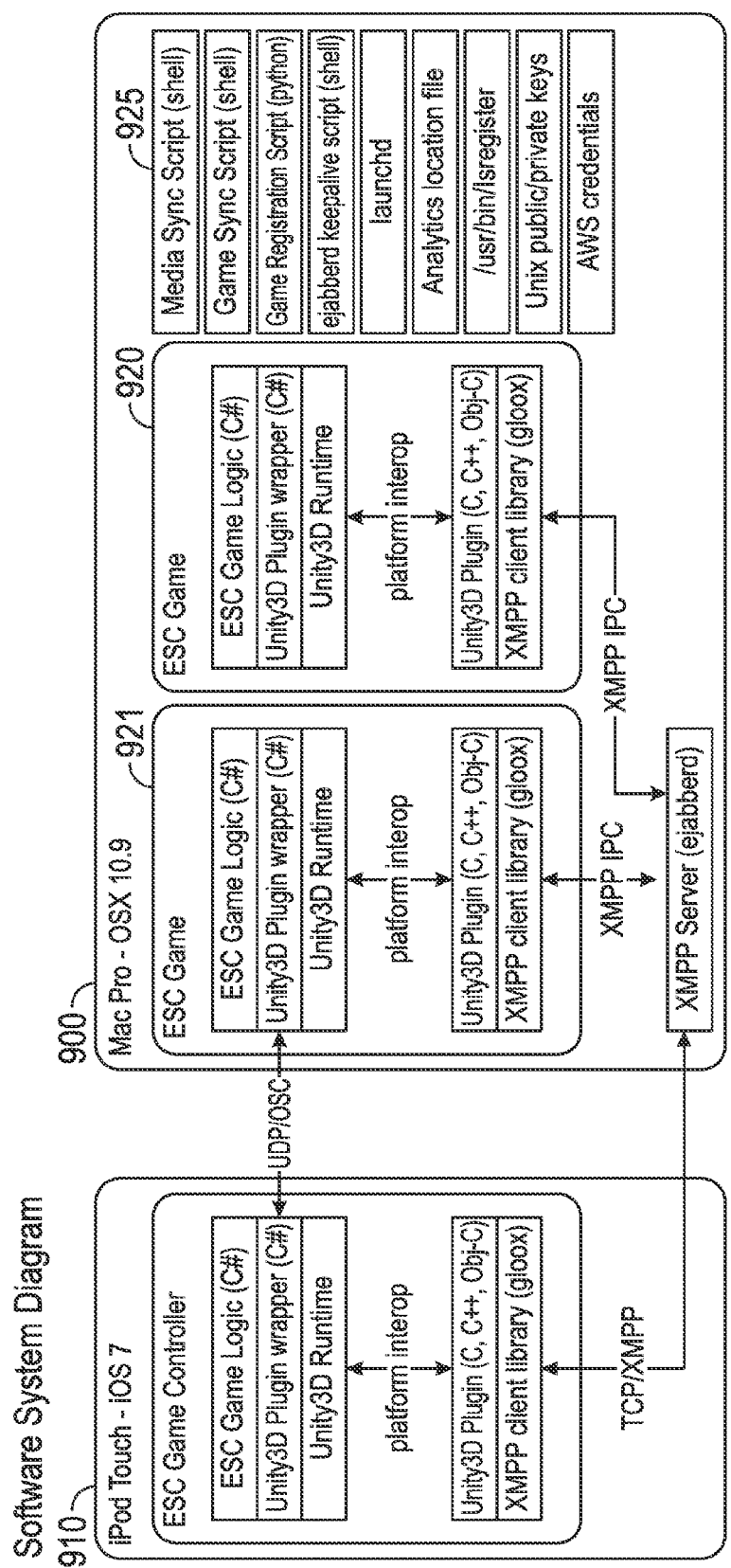
Figure 10:
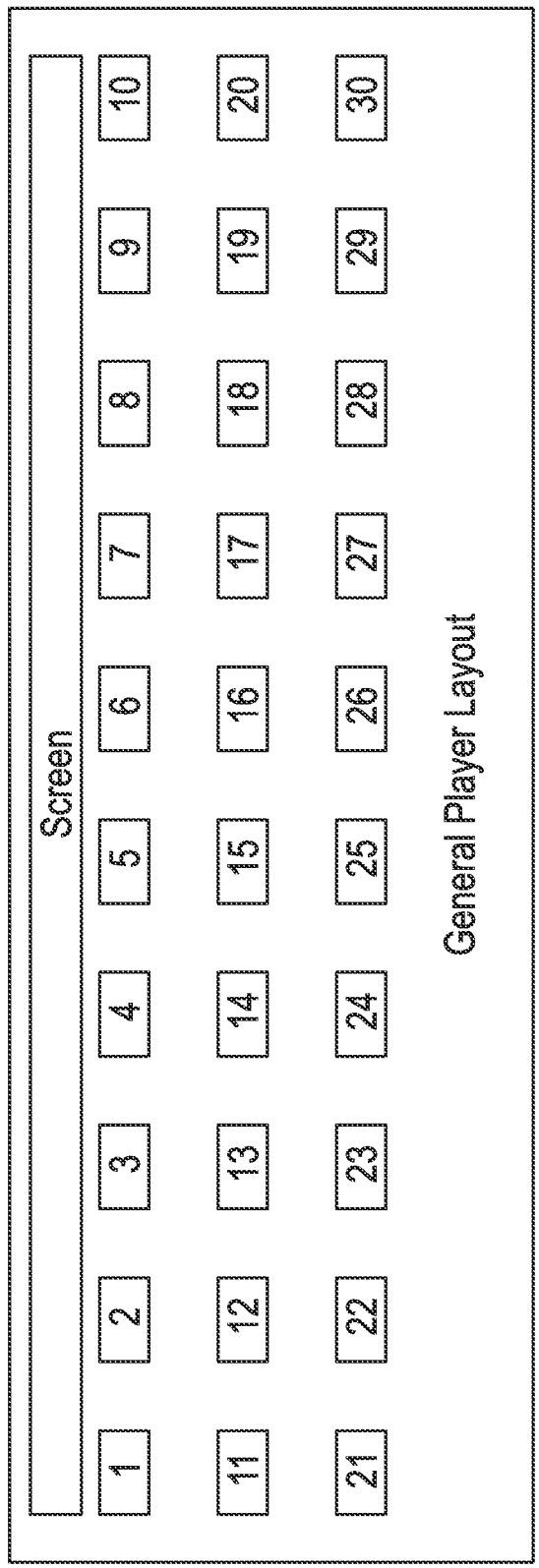
Figure 11:
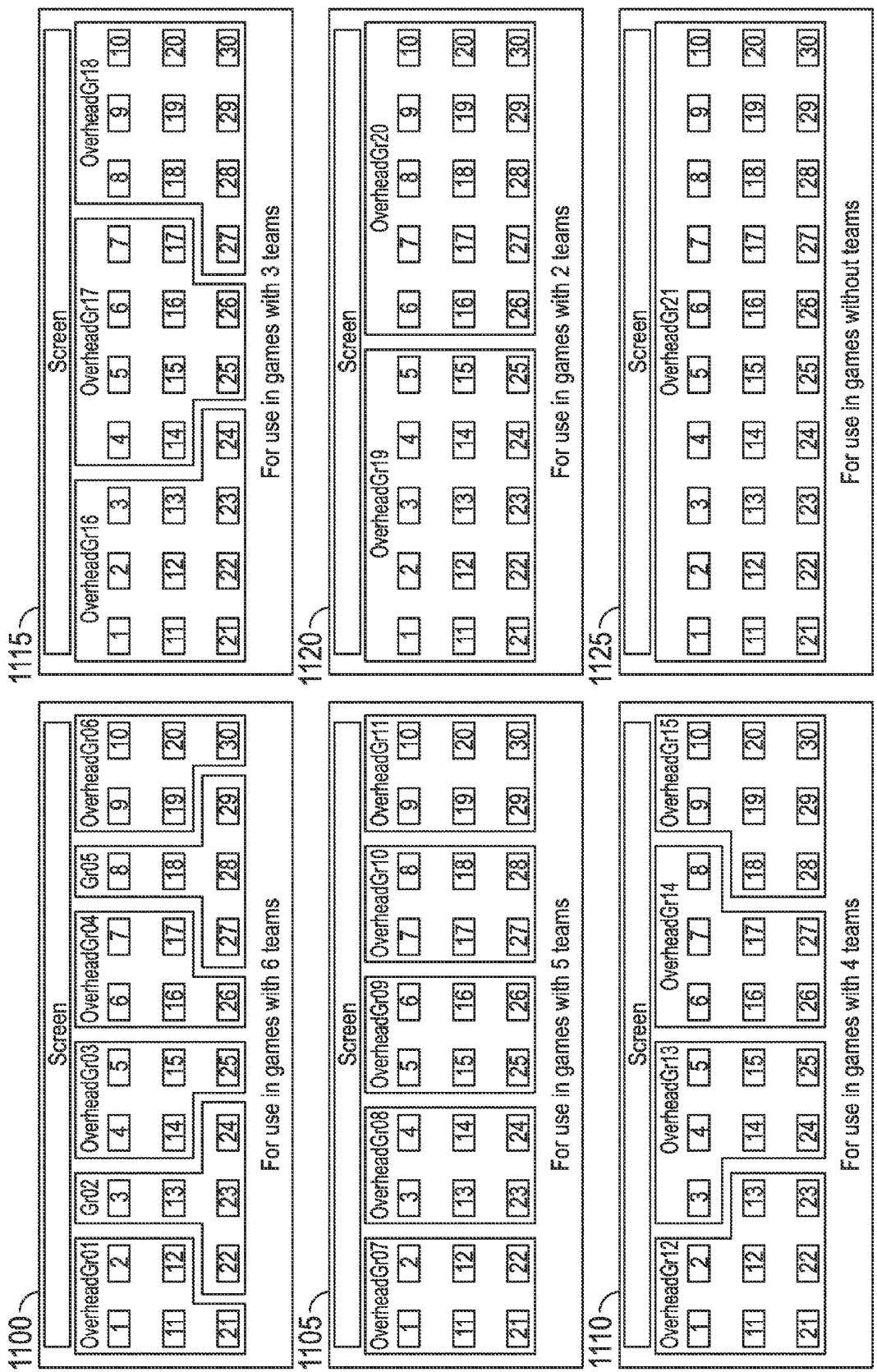
Figure 12:
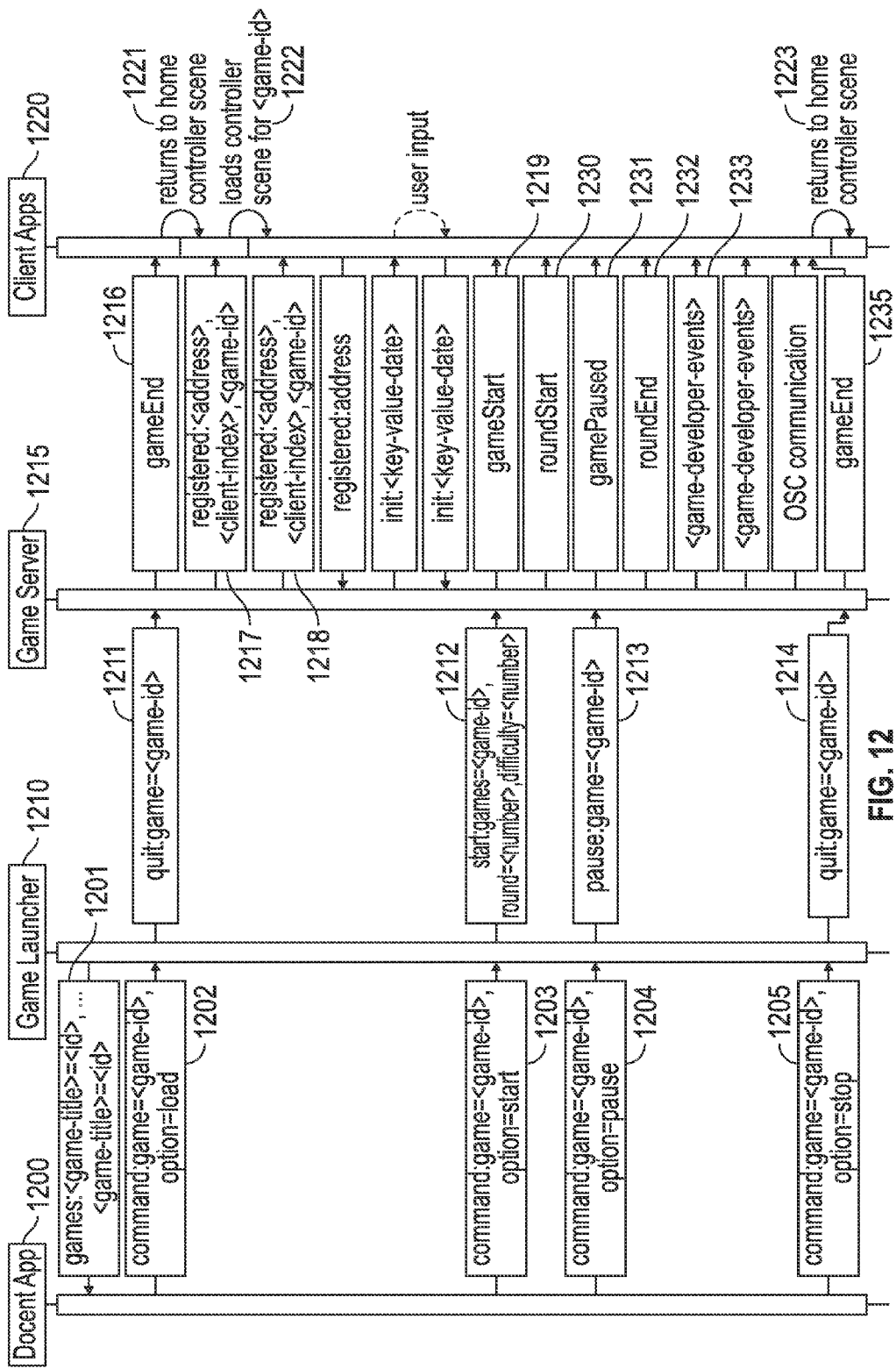

BRIEF DESCRIPTION OF THE DRAWINGS in the drawings:
the figures show aspects of the invention, where;
FIG. 1 shows a block diagram showing the operation of the interconnecting computers making up the invention;
FIG. 2 shows a block diagram of computers of an embodiment;
FIG. 3 shows a specific gaming room or area according to a first embodiment;
FIG. 4 shows a second gaming room or area called the stage;
FIG. 5 shows another gaming room or area which has barriers for detecting locations of people;
FIG. 6 shows another gaming room or area with a big screen dome;
FIG. 7 shows another gaming room with an interactive floor;
FIG. 8 illustrates a block diagram showing the different processing systems which are used according to an embodiment;
FIG. 9 shows a software system diagram used along with the embodiment of FIG. 8;
FIG. 10 shows an exemplary layout for different players;
FIG. 11 shows different team arrangements for the players; and
FIG. 12 shows an overall flow diagram between the different modules.

DETAILED DESCRIPTION

Embodiments described herein that uses multiple different cascading servers in order to carry out game functions in a special light and/or sound controllable room. The servers enable many different devices to be integrated into the game. One advantage of this system is that this enables peripherals to be used of a type which are not normally used in games.

For example, one embodiment describes producing stage lighting style cues as part of the game, where the stage lighting cues cause external stage lighting equipment to create effects that are based on things that happen in the game. In essence, the game controls the cues, thereby causing the game to control outputs that have previously been controlled only as part of the stage lighting system. This creates interactive stage lighting effects that become part of the game experience.

One aspect is that the game is specifically configured or "tuned" for a specific room. The specific rooms that can be used are described throughout this specification. In one embodiment, there can be a special gaming area, that has multiple different rooms for multiple different formats of games. The embodiments are shown in the figures and described herein.

FIG. 1 illustrates a flow of the game, and shows the interaction of the various servers. According to an embodiment, there are a number of controllers, and each player uses one controller. The controllers in this embodiment are portable computers with input capability and display screens and sound output. An embodiment uses an IPOD TOUCH™ controller, however, any portable computer can be used for this purpose.

As illustrated in FIG. 1, the basic system includes a game engine 100, connected to a game server 150, which is connected via a wireless connection 151 to one or more controllers. The controllers are shown as controller 190 and controller 191. The wireless connection can be any kind of connection, such as Bluetooth, Wi-Fi, or cellular.

In operation, the game server operates by starting two different connections. An HTTP connection 155 is initially used to discover and configure the controllers, such that subsequent communication can be directly from the game engine 100 discussed herein, to the controllers. The game server also starts an XMPP server 160 that sends messages back and forth to the controllers.

The HTTP server instructs the controller to open, and to load XM PP data as shown as 192 in FIG. 1. Roster data is then connected, and the XM PP server serves as a gateway to the game engine 100 which is operated as described herein. At 194, the controller then obtains game registration information directly from the game engine, and sends a unique address such as an IP address at 195. At 196 the controller opens the game view that is sent from the game engine.

The game engine flow is shown as on the left side of FIG. 1, where the system first opens and contacts the XM PP server. Each of the clients is a controller that has communicated with the XM PP server. At 107, the game engine loads a roster of those clients, and from that at 108 finds the online controllers. Different controllers can be online at different times. This presupposes that all the controllers have been preconfigured, but another embodiment can allow users to use their own units such as their own smart phones or tablets, and the action of finding the controllers and finding the roster may include finding the user's online controllers.

In one embodiment, the user's personal smartphone or tablet is used as the controller in the game. The game is carried out within a pay-to-enter facility also referred to herein as the multiplex, so the users must pay in order to go in. In one embodiment, when the users pay, actions are taken to automatically register the smart phone/tablet to allow that smart phone/tablet to interact with the game. In this way, two tiers of admission can be possible. People can be admitted but not allowed to play the games, in essence only spectators. Those people might be charged a first admission fee, which is a lower version of the admission fee. However, those users will be prohibited from interacting with the game. Users who want to play in the game are charged a different level, presumably higher, admission fee. This produces the advantage that the users can either accompany someone else who is playing without getting charged a higher rate, or can simply go in to look around. More details about the specific area are described herein as the different parts of the multiplex.

Once a controller is registered, at 110 game engine begins communicating directly via 111 to the registered controller. The game engine receives the controller's IP address at 111 and sends the game data to the clients, causing those clients to open their game view. When all controllers are ready at 115, again start message is sent to the controllers, and the controllers begin the game at 197.

In one embodiment, a number of different computers can be used as part of either the game engine or the game server, to communicate with external devices. One embodiment can be use an LED wall 120 to receive the game outputs, so that the LED wall becomes part of the game operation. Other outputs to other professional caliber devices can also be used. For example, outputs can be to the stage lights 121 or to MIDI 122. An embodiment can send MIDI information to an external MIDI device that may produce the sounds. Different outputs can send cue information, e.g., in DMX-512 format, to various parts in the room.

FIG. 2 illustrates a block diagram of the overall system, including the different parts of the system. The game server 150 communicates with the game engine 110 as described previously. In addition, the game server produces sound outputs 210 which can be in open sound control or OSC format. The OSC format outputs can be converted to MIDI by a converter 215. The MIDI outputs can create both audio playback via the MIDI controller and also an audio output 220. The OSC output can also create MIDI which creates lighting output via a lighting console 225. The lighting console 225 may control a stage lighting media server such as the M box 230. This in itself can control stage lighting projectors and lighting devices including a Marquee projector 235, as well as wash style lighting, such as the versa tubes at 240 which are light controllable and dimmable tubular elongated light devices.

The game engine may also produce outputs which are combined together by warp processors and DVI switches 250 with canned playback. For example, the canned playback may include different forms of playback shown as 251 and 252. The canned playback can be lighting cues, video output, or sound output. The output can also control cinema projectors 255, 260. In addition, this can control either directly or through a separate computer LED walls 207.

In essence, this becomes player controlled show control, where show control is used to control the aspects of the game under control of the game, and based on actions that occur in the game. Unlike previous systems in which the game designer created the content, this enables a lighting or audio designer to create content that is used in the game. The content created by the lighting or audio designer formed into a pallet of cues where each cue controls multiple different lighting devices and/or sound devices to create an effect. The game design selects one or more of those cues to be displayed. The cues can be sound, light, fog or any other stage controlled feature.

The sound can be played in the area, but can also be played on the handheld controlling device as part of the game. Lighting can also be controlled to appear on the screen of the mobile device.

Another aspect keeps track of the locations of the different controllers, within the area and uses the player's location in the real world as an input for the virtual world game. For example, if player 1 is at location x1, y1 in the area, the system can automatically determine that, and can produce game outputs that are directed to the area location x1, y1 to illuminate or make sounds to the player. In one game, for example, when the player meets a milestone, the player automatically receives certain sounds and/or a lighting effects such as a spotlight that shines on the player. In this embodiment, the system can keep track of the location of the player. When the player meets that milestone, the sound can automatically be played in that location.

Another embodiment describes an emulator, for the game, that shows what the game will look like with people in the room in the arena shown herein. This emulates the real space but also controls the real space.

An embodiment uses this system into form a multiplex gaming destination, that combines live action, digital, and social gaming in a spectacularly immersive environment. The multiplex embodiment described herein and as shown in FIG. 3, has four different game theaters, combined with a large restaurant and several smaller cafes and bars. The theaters in one embodiment are intended to be flexible, modular spaces equipped with immersive media capabilities. The four game theaters can include the World, the Arena, the Cabaret, the Floor, each described herein. Each theater supports a different gaming platform. These spaces also accommodate some form of queuing, which in most theaters acts as a comfortable viewing area for spectators as well.

Each of the different theaters can be an immersive theater with large screen projections and theatrical lighting and sound systems that together create a variety of "worlds." Players arrayed on an open floor in front of the screens, act together or individually to control what happens in the World. Each player uses a digital device—a tablet—to communicate with the screen. Holding the device in both hands, players move their avatars on the screen to direct the action. The devices have a vibration capability, which also creates tactile responses to play. The embodiment described herein describes different games which are intended for play in a different theater. A brief description of the games follows.

Game 1: Spotter Players see a changing crowd of recognizable celebrities on the large screen. A list of celebrities' names appears on each player's device, along with as unique hat avatar. Using their digital devices, players guide their hats across the large screen and onto the heads of celebrities.

The player who gets the most hats on the most celebrities from his or her list wins the game. As the rounds progress, the numbers of celebrities increase, and the players receive Apples and Eggs to knock off other players hats, thus lowering their scores. Game 2: SnB On the large screen, players see thousands of particles streaming across the screen. Using a hand-held digital device, each player controls an on-screen Turret that sucks up the particles. By rotating the device, players try to position the Turret to suck up the most particles (thereby getting points). At the same time, they must avoid big, bad, red particles (which lose them points) by blowing them away. To do so, they tap a "blow" icon on their hand-held devices, which makes the Turret blow instead of suck. The players compete in two teams, with the winning team being the one with the most points after three rounds.

FIG. 4 illustrates a first gaming room referred to as the stage. This device includes tables and chairs along with environmental lighting with programmable spotlights. FIG. 4 shows only a few of these lights 400, 402, however it should be understood that there can be many of these lights. Any of these lights can be pan and tilt controllable lights. In addition to the lighting, there are also tables shown as 410, 412 and 414. The controller device shown as 415 can be moved from table to table, as the users move from table to table. Also, a motion tracking device 420 can detect the location of the device 415. Again, only one device is shown, although it should be understood that many different devices can be used in the system.

A video projector 421 is shown associated with the table 412, however, the different tables 410, 412, 414 can each include their own video projector or the video projector can be pan and tilt controllable. For example, this can use a digital light configured as a video projector.

In operation, the CPU 450 can include all or any of the controllers previously discussed. The CPU controls each of the devices according to the game engine. A wireless LAN device 455 communicates with each of the devices. In addition, the CPU produces show control outputs which control a show control device 460 such as a lighting console. Outputs from the console are displayed on the display screen 470.

The tables can be a series of multi-touch tables and a number of large displays. Players can use their tablets and the table as input devices for each game. The multi-touch table can detect discrete objects placed on the table and can distinguish between objects using unique identifiers which could be RFID based devices or the unique shapes of the items. Items from the bar/restaurant have built in identifiers and allow patrons to interact with the tables. The tables can also include touch screens. LCD touchscreen tables such as the Samsung SUR40 can be used to provide the required sensing technology. The large projection screen can be tied to the games on the tables or stand alone. Cameras provide live feeds and can pinpoint players and show them on the large projection; games are support by multi-channel audio and a theatrical lighting system.

FIG. 5 represents a different immersive environment referred to as the "arena". The arena includes raised floors with ramps that have environmental lighting. As in the stage, there can be multiple lighting devices shown as 500, controlled by the show control device 502 based on outputs from the CPU 504. Of course, the CPU 504 can be the same as the CPU 450. Speakers such as 506 can also be controlled in an analogous way. In this embodiment, users can wear a wearable device 510 such as a vest or necklace, and can also include their controller such as 512. The wearable device 510 can interact with the different barriers that are produced or located throughout the location. One such area was shown is 520, and this may include an integrated touchscreen 522 as well as an RFID device 524. The RFID device can be used to communicate with a corresponding RFID on either the device 512 or on the wearable device 510. The beacon device can also include integrated LED lighting which 526 which becomes part of the game. The beacon device 520 is shown as being substantially triangular in cross-section. There can also be other devices including the barrier device 530 which includes LED lighting 531, and other barrier devices 540 which do not include LED lighting. The barrier without LED lighting can be illuminated by a video projector 541.

Each of the barriers can include beam breakers shown as 533 which can track the location of the user.

Barriers can be internally illuminated, include a large touchscreen or be without display technology and act as a projection surface for ceiling mounted projectors. RFID readers, beam-break technology and a sturdy connector that allows physical props to connect to each barrier engage the player in physical challenges. Physical props include items such as balance beams, large button pads, scales, rope-swings, and laser beam break supported by a fog machine.

The overall space includes a multi-channel audio system to support the game play along with theatrical lighting. A players tablet and device allow them to input information, control interactions in the space, communicate, gather information, and identify players to one another.

The dome is shown in FIG. 6, and can include a large screen dome 600 in addition to or in place of the devices previously discussed. This device can include bleacher seating 605 so that all users can see the contents of the dome.

The floor shown in FIG. 7 can be an interactive floor 700 allowing the location on the floor to be used as part of the game.

In any and all of these embodiments, the user's locations can be tracked. when players visit the space, their position and game performance is tracked. Players that visit the space will, at a minimum, create a guest membership account to track stats and display accomplishments during a single play session. The full membership includes a profile that is created on-site or online that includes tracking of all achievements and actions, allowing for a fully customized and simplified experience. All transactions are then linked to the user's account, allowed the player to streamline everything from drink orders, to merchandise sales, to game sessions, to micro-sales. The profile includes meta-data about the player, a gaming handle, an avatar with customization capabilities, and all Meta data and game data.

All of these areas can allow users to interact with the games and each other. Devices and Touchscreens can control elements on the Big Screen through touch but also through a unique identifier. One approach for control is through tracking the unique identifier. The unique identifier can be a QR type barcode or an IR emitter that is either on the back of the device or on an attachment that connects to the device. The unique identifier will be detected using cameras or other sensing devices placed around the room. The device position and angle is able to be accurately detected so that it can control and interact with the main display screen in the area (e.g. the big screen 470 and stage, or the big screen 600 in the dome or the scoreboard 702 in the floor). The different rooms also include cameras or other kinds of movement detectors. When cameras are used, they can be used to allow for augmented reality moments in which the player sees themselves on the screen.

Each of the areas also includes a multi-channel audio system to support the game play along with theatrical lighting.

Therefore, all of the different areas have different layouts, but have a few things in common. All of these areas enable users to interact with the games from different locations within the layout. All of these have the ability to track the user's location in the layout, and to provide interaction with the user that is specific to the user's location. All of these have some kind of display, and while the display is different for the different locations, the display facilitates the user interacting with the game. In addition to the display, however, there are also position controllable lights, and also sound that is controllable by the game controller to different locations.

The specific games can be optimized for use in different specific locations. Two of the specific aims are described herein. The first game is called "spotter". This is a hidden picture game with trivia and competition intended to be played in the dome.

The story line is as follows:

Claim victory as an expert Spotter by placing hats onto famous heads. Can you find a Super Bowl Champion? A Hollywood Starlet? A famous monkey? Use your incredible eye to catch the recognizable pop crew from yesterday and today. Can you take the Top Spot?

The goal of the game is to place the most hats on the recognizable characters.

Group Goal

The goal for each round is to have the most hats at the end of the game in comparison with previous rounds and play sessions (see Best Scene Ever).

Setup

The world screen shows the People.

The players each receive an iPod Touch that acts as their Hat Deployer.

Description

Players start by logging into their iPod Touch, taking a picture of themselves, choosing an avatar, and choosing a hat. Their picture and hat instantly appear on the Scoreboard on the large display. They each are automatically given an assignment. Each assignment is simply a name or identifier for a person to "hat" on the screen.

The iPod Touch screen turns into a touchpad and a reticule/hat combination representing the player appears on the large screen. In order to complete assignments, players must move the avatar to particular "people" on the screen and place a hat on that person's head. The avatar is moved using the accelerometer in the iPod Touch.

The game is made up of three timed rounds and the player with the most hats at the end of the game wins.

Assignments

On the player's iPod Touch are slots for three assignments and an inventory. Assignments work on a branching structure—as players satisfy the requirements, new ones of a greater difficulty appear. There are also fewer assignments available as the players get to more difficult branches, which means that sometimes players are competing with one another to complete the same task (and be forced to stack hats). Players do not need to finish the assignments in any particular order and get a new one immediately upon finishing another one.

The Inventory

Items other than Hats, come in limited quantities. Each player has an inventory, which can hold Apples, Eggs, Pies, and Umbrellas. Some assignments reward the player with one or more items, as indicated on the Assignment List.

An endless loop of people dropping onto the screen and falling from the bottom. The people vary in size. At first in a traditional "large in front, small in back" faux 3D perspective, but then more and more random distribution of sizes.

People that have been "hatted" by a player will slowly recede into the background, but always stay present on the screen, unless an apple knocks off the hat. Assignment targets also recede into the background over time to make "hatting" them more difficult.

Hats Deployment

Each player has a hat deployer (iPod Touch) that they use to control the reticule on the screen. This deployer also shows the current assignments. Once a player puts the reticule on a person they need to find, they hit a button and the hat appears on that person. If a hat is already on a person, new hats are stacked (called hat stacking).

Players begin the game by choosing which type of hat they want to deploy and the type of reticule to control. Hats are unique per each player.

Scoreboard

The scoreboard is on the large display and shows each one of the player's faces along with their chosen hat. The scoreboard is ordered in real-time showing the player that has the most hats on the screen. As players place more hats, the scoreboard will reorder to show which player is in the lead.

Apples

Apples have the ability to knock a hat (or hats if they are stacked) off of a person on the screen. This affects the number of people the target player has "hatted" and affects their place on the scoreboard.

Pies

Pies come in a variety of flavors, which determine their color and longevity on the screen. If a player throws a pie at a person without a hat, that person cannot receive a hat until the pie drips off completely. People wearing hats are unaffected by pies.

Eggs obscure a large part of the screen—as if someone threw an egg at the physical screen. The entire spread slowly drips down and disappears after a set period of time. While an egg is on the screen, players cannot see any of the people behind the throw—which means that no hats can be placed while the egg is still blocking the view. Eggs can be used offensively or defensively.

Umbrellas can be placed above the head of a person on the screen (whether they are wearing a hat or not) and prevent anything bad from happening to them over a set period of time—this means they will not be affected by apples, pies, or eggs as long as the umbrella is present.

Shout Hints

Shout Hints allow a player to call out a specific name, such as "John Wayne," and have that person's head get larger on the screen, therefore making it easier to find. If nothing happens to an enlarged head after a set period of time (meaning that no one puts a hat on or throws an item at it), the head (and person) floats off of the screen. Each player starts with 2 Shout Hints at the beginning of the game.

Players can also get a hint by tapping on the assignment on the iPod Touch. This will bring up a picture of the target's face.

Hat Stacking

If a player has an assignment that already has a hat, they may stack their hat on top of that person as well. This is a risky move, however, because another player is more likely to use apples on stacked hats.

Errors

Players will undoubtedly make mistakes throughout the game and initiate a bad deployment. When this occurs, the hat simply falls away and is not placed on the incorrect target.

Rounds

There are three rounds of Spotter, varying in length between one and two minutes. Each set of rounds is named with a unique title (such as Cosmopolitan or Chieftain) and the date. This makes it easier for players to remember which games they participated in over time. At the end of each round, a round winner is announced and at the end of the game, the meta-goal Best Scene Ever is compared, before the next game begins.

Difficulty

As the game progresses and players complete more assignments, there are different ways that the difficulty increases.

1. The assignments use more difficult identifiers. Instead of having a person's name ("Barack Obama") it may have a piece of trivia ("The 44th President").

2. The speed in which new "people" that appear on the screen and then recede increases. Also, the total number of that particular target person on the large display decreases. This means that there may be 10 Barack Obama's in the first round, but only three in the third round, making him harder to find. Also, he gets smaller and farther "back" quicker than in earlier rounds.

3. The number of items in the game increases. Later assignments reward the players with more and more "griefing" items.

Ending the Game

After three rounds of play, the player with the most cumulative hats is "crowned" the winner and recognized on the large display. The final Best Scene Ever comparison moment occurs and the group's total success is shared.

Best Scene Ever

Once the game has completed, a snapshot of the scene is taken and compared to previous play sessions. The more hats present, the better that the group has done on the whole.

Game Scenario Narrative

Shawn enters the space with his friend Karen to play Spotter. Shawn's a big gamer, but Karen is not.

They receive an IPOD TOUCH™ and see that the game is called Spotter. The room is filled with about 20 other players. The space is lit well and feels playful. The IPOD TOUCH™ has instructions on how to continue.

They each take their picture and make selections as indicated on the IPOD™. Shawn chooses to use a Fez hat and the Wing reticule. Karen chooses a Sombrero hat and the Finger reticule.

Each of their pictures appear on the screen as part of the scoreboard. They are wearing the hats they chose.

A short introduction animation plays. They have to use the iPod to control the reticule on the screen. The players will be putting hats on celebrities to complete assignments—seems pretty easy, like a multi-player "Where's Waldo."

While the introduction is playing, Shawn and Karen are about to move their reticules around the screen. Shawn is a natural and Karen gets the hang of it pretty quickly.

The introduction finishes and pictures of people start appearing on the screen—some from the top, some from the bottom. They are big, small—sometimes even upside down. The whole scene is immersive and whimsical.

Karen looks at her three assignments: "Barack Obama," "Bugs Bunny," and "Frankenstein's Monster." She sees that her reticule is pretty close to John Lennon—so she hones in on him and puts the Sombrero on his head. There's a lighting flare, her iPod vibrates, and she gets points on the screen. The whole sequence is very exciting! A new assignment appears and she continues to play.

Later in the game, Shawn is behind and begins to frantically finish assignments, sometimes stacking hats onto people with hats already there. In a short period of time, he hats Michael Jordan, Michael Phelps, Shawn Johnson, Usain Bolt, and Muhammad Ali.

Karen gets frustrated trying to find John Wayne. She's been holding onto that assignment since the beginning of the round. She uses a Shout Hint and shouts his name. His head gets really big, but before she can put a hat on it, someone throws a pie at his face, blocking her!

Shawn wins the first round and Karen comes in second in the second round. Karen would have won, but someone used an apple to knock off a stack of hats that included her sombrero!

The timer appears during the third round and in the final moment, Shawn is able to place a hat to complete a very difficult assignment and take the lead. Karen gets eighth place, which isn't that bad considering it was her first time.

The entire group's effort is compared to other play sessions and it turns out that they placed more hats than any other group. The entire audience cheers.

The outro animation happens and players return the iPods while the space transitions to an intermission moment.

Moment-By-Moment Player Description

Player enters the World

Player sees the big screen displaying ambient imagery and animation

Player receives an iPod Touch

Player receives instructions on how to continue via the iPod

Player takes her/his picture

Player selects a hat

Scoreboard is populated with player's face and hat

Player selects a reticule

Player uses the iPod to control the reticule on the screen

Player is instructed to wait until all players have joined the game

A short introduction animation plays when all players have joined

The screen is populated with "people"

Player receives a one assignment (eventually getting three)

Round 1 begins

Player looks for the right faces

Player finds a face

Player directs the reticule to the face

Player deploys a hat to the face—it is the correct face

A positive environmental sound is triggered

A lighting flare emits in the World

Player's iPod vibrates

Player looks for faces

Player finds a face

Player directs reticule to the face

Player deploys hat to the face—it is the incorrect face

A negative environmental sound is triggered

Player's iPod vibrates

Player finishes first two rounds

A timer appears on screen in the final moment

Player wins or loses

Player sees scoreboard appear on screen

Scoreboard includes individual scores and the group score

The group's success is compared with previous sessions
The outro animation begins
The intermission moment begins
  The next game is a Time Based Flow called Spotter.
  Pre-Game
  1. iPod Touches™ are placed face up on a table with the Spotter app pre-loaded. The face of each player is on a screen or, in the case of a player with a missing picture, a silhouette.
  2. The players each pick up the iPod that displays her or his face. Before a single player hits "Ready," the large display is a closed curtain with the Spotter Logo on it.
  3. The players move out onto the floor in front of the large display and hit "ready." When a player hits "ready," their face or silhouette (if no face available) appear on the scoreboard. Then their hat reticle appears at the middle of the screen and sweeps up to the player's score "icon." They are able to move the reticle around the screen and place a hat on any of the three characters on the screen while waiting for the other players. They are also able to "stack hats" and throw apples to clear away the hats on a character's head. If the hat stack gets too high, it is automatically cleared.
  On the first "Ready" click, the curtain pulls back to reveal 3 characters that can receive hats.
  There is text and imagery on the screen that says, "Practice putting hats onto character's heads and using apples to knock the hats off. You can also stack hats—give it a try!"
  Countdown
  4. When the final player hits "ready," a 20 second countdown appears (this may be adjusted). The countdown gives the last player a chance to move around the screen and get acquainted with the system before the game begins. Each player is given her or his first assignment—a single name that becomes active when the countdown ends.
  After the final player hits "Ready," a 20-second countdown begins.
  After 15 seconds, the curtain closes and displays this text, "Check your assignments now and good luck!"
  5. During the last 5 seconds of the countdown (to be finalized in testing), the curtain starts opening slowly. During this time, players cannot place hats until the timer has completed. The screen is slightly dimmed with the reticles at full brightness so players do not lose their spot. A sound and lighting flourish trigger the beginning of the game.
  When the final five seconds are done, the curtain pulls back and the game begins.
  Round 1
  6. The first round lasts two minutes (to be finalized in testing). Players start with a single assignment. When they have completed the assignment, two more appear. When they have completed one more assignment (the second assignment since the beginning of the game), two more assignments appear. Once they have three total assignments, players will have three assignments for the rest of the game. If a player does not "unlock" a second or third assignment slot during the first round, they will have to "unlock" them in a subsequent round.
  The bottom LED acts like a ticker with information about what is happening on the screen. The information is all character-based.
  Information is triggered whenever a character is hatted, hit by an apple or hit by a pie.
  Text for being hatted, "[Character Name] is now wearing a [hat name]!"
  Text for being apple'd, "The [hat name] (and [hat name] . . . If stacked) was totally knocked off of [character name] using an apple!"
  Text for being pied, "[Character name]'s face is covered in pie!"
  7. The first round only has Hats and Apples as available options to the player. Each player has unlimited Hats and begins with a single Apple. As the round progresses, Apples are rewarded every so often for successfully completed assignments.
  8. The scoreboard updates in real time as players place hats successfully or the hats are knocked off.
  Round 1 Countdown
  9. Round 1 ends with a 10 second (to be finalized in testing) countdown. A rush of wind blows across the physical space and the virtual space, clearing all of the non-hatted characters (or all of the characters if this is not possible).
  Each round ends with a 10 second, on-screen countdown.
  The first round ends with a huge gust a wind moving across the screen.
  Each round end concludes with the curtain closing.
  First Intermission
  10. The large display then shows a 20 second countdown (this may be adjusted) until Round 2 begins. The screen shows new instructional text about what is happening in Round 2, specifically that there will be more characters, character transitions are faster, and Apples are active. In addition to the instructional text, the top 3 players are highlighted in the center of the large display. Halfway through the countdown, players receive brand new assignments.
  The top 3 players are shown on the screen, starting with #3, then revealing #2, and #1.
  The first intermission displays this text on the screen, "Characters appear and disappear faster—and watch out for apples!"
  11. During the last 5 seconds of the countdown (to be finalized in testing), the curtain slowly opens. During this time, players cannot place hats until the timer has completed. A sound and lighting flourish trigger the beginning of Round 2.
  Round 2
  12. Round 2 is 1 minute and 30 seconds long (to be finalized in testing). The round has a higher frequency and variety of "surprises" that move across the top section of the large display.
  Round 2 Countdown
  13. Round 2 ends with a 10 second (to be finalized in testing) countdown. An earthquake clears all of the non-hatted characters (or all of the characters if this is not possible).
  Each round ends with a 10 second, on-screen countdown.
  The second round ends with Godzilla crossing the screen.
  Each round end concludes with the curtain closing.
  Second Intermission
  14. The large display then shows a 20 second countdown (this may be adjusted) until Round 3 (the final round) begins. The screen shows new instructional text about what is happening in Round 3, specifically that there will be more characters, character transitions are even faster, and Pies and Eggs are active. In addition to the instructional text, the top 3 players are highlighted in the center of the large display. Halfway through the countdown, players receive brand new assignments.
  The top 3 players are shown on the screen, starting with #3, then revealing #2, and #1.
  The second intermission displays this text, "Pies knock the hat off of a player's head and Eggs splatter all over the screen!"

15. During the last 5 seconds of the countdown (to be finalized in testing), the curtain slowly opens. During this time, players cannot place hats until the timer has completed. A sound and lighting flourish trigger the beginning of Round 3.

Round 3

16. Round 3 is 1 minute and 15 seconds long (to be finalized in testing). The round introduces eggs and pies (and does not have apples), the highest frequency and variety of "surprises" that move across the top section of the large display, and the most density and transition speed of characters.

Round 3 Countdown

17. Round 3 ends with a 10 second countdown.

Each round ends with a 10 second, on-screen countdown.

The third, and final, round ends with an eruption, which just displays smoke coming up from the bottom of the display and fog filling the space Each round end concludes with the curtain closing.

End of Game

18. Fog fills the space and moves across the screen. The final score is revealed on the large display, particularly highlighting the top 3 hatters. In addition, the group's score is compared to all other play sessions and ranked.

Between Game Intermission

1. The large display transitions from the end state of the game to a looping video that gives the atmosphere of a social club. The lighting and sound transition to allow for social activities, such as dancing, talking and drinking. The players return their iPods to the facilitators so they can be loaded with the next game. A countdown until the next game appears on the screen (roughly 2-3 minutes).

The SnB game is described as follows:

This can be played in the "World" part of the ESC.

Story Pitch

Beneath a haze of chaos lies a secret prize—two teams battle to uncover the mystery and conquer the World by using sophisticated vacuum technology. Only one group will dominate and be the ultimate suckers!

Goal

To score the most points for your team before the reveal.

Setup

The World Screen shows a moving particle system with other objects along with a grid of Turrets.

The Floor indicates different "spaces" to stand to control the Turrets.

The Players receive an iPod Touch that controls the Nozzle on the Turret.

Players start by splitting into two teams and choosing a position on the floor in front of the large screen. Each of the spaces on the floor corresponds to a turret on the screen. Players register their spot to control the particular turret and assign that turret to their team.

The screen displays a large particle array with two main types of objects floating across the entire space: (1) particles and (2) hazards. The iPod Touches display a switch that allows the players to change from suck to blow, as well as a variable slider for controlling the concentration of the "power"—whether it's a narrow and strong beam or a weaker, but spread out beam.

The goal of the game is to gain the most points before the hidden object is completely uncovered. Particles score a minimal amount of points, bonus objects score significantly more and hazards take away points, as well as some other annoyances.

Turrets

Each player controls a turret, which is in a fixed position on the screen. The turret configurations may vary depending on round (TBD). Turrets cannot move. Each turret has a single "nozzle" that the players control.

Nozzles

Nozzles are attached to turrets and can move 360°. The nozzle can vary in suck/blow strength by changing the width—a wider nozzle allows larger objects to be sucked in and distributes the power to a larger swath, but also is weaker; a narrow nozzle allows smaller objects to be sucked, but concentrates the strength as a strong beam.

Teams

There are two teams that play SnB: Red versus Blue. Each team gets to choose which turret they want to control at the beginning of the game. Beginners will have a more random distribution, while those that have played a couple of rounds will seek out specific spots for them and their teammates. Teams need to work together to bring in the most points—by grabbing larger particles together and repelling larger hazards together.

The more points that an individual player accumulates, the greater the power their nozzle has. Essentially, the more players "suck," the more they can "suck" (and blow).

All objects on the screen, except for the turrets, "float" as if in a shallow pool of water. The larger objects have a weight to them that makes them more difficult to move. Some particles (in later rounds) have interesting shapes, such as rods, which can spin through the space and have varying levels of resistance depending on the angle of the pull or push.

Any particle, depending on size, can get stuck in a nozzle. The player must either blow that object away (if it is too large) or can adjust the size of the nozzle to accommodate the larger mass.

Give the player points based on the size of the particle. Larger particles=more points. It can be odd shapes in later rounds. The system takes away points based on size. Larger particles=more points taken away.

There are also a number of hazards. Point Loss—Lose 300 points if swallowed. Power Decrease—Temporarily lose power. Nozzle Blocker—Temporarily lose the ability to swallow. Confuser—Temporarily have controls reversed. Blinders—Temporarily be covered The most plentiful object on the screen is particles of varying sizes that float around and can be sucked or blown by the nozzles. Particles have a point value based on size—the larger the particle, the higher the value. Particles are either positive (meaning they reward the player with points) or negative (meaning they take away points). The more points a player has, the stronger their nozzle.

Game Scenario Narrative

Nancy enters the ESC World space and receives an iPod Touch. She's never played a game like this before, so she's a bit nervous.

The game is called SnB. She is given the option of choosing one of two teams or just selecting "Place me on a team." She is put on the Blue team.

The iPod then asks her to select a Turret position. She really doesn't know how that will affect the outcome of the game, so she selects "Pick one for me" and follows the instructions. She has to go stand on a space on the floor indicated by a bright spotlight.

Once in her spot, Nancy is able to move the turret around on the large screen. That part is really easy. There are other controls on the iPod, but she knows she has the basics down. The space is very large with a couple dozen other players finding their spots.

The game starts with an intro animation and the instructions, which seem pretty each. Use the iPod to control a turret. Use the turret to suck up positive particles (that are blue) and blow away negative particles (that are red). The larger the particle, the more points you gain or lose. There are also hazards, which look different, so it's best to avoid those altogether.

Nancy understands the basic idea. She wants her team to win, so she's very into avoiding the bad stuff. The game starts with very few hazards or negative particles, which makes it pretty easy. Nancy learns that by adjusting the nozzle size, she can change the width and power of the vacuum. This gives her a lot of control over her success. She can even feel the particles being sucked into her device.

The particles start getting larger and heavier, which makes the game much more difficult. Nancy starts shouting to her teammates to work together. If she uses her nozzle to blow good particles toward other blue turrets, the team will win.

Nancy accidentally sucks up a Confuser Hazard. For a short period of time, all of her controls are completely reversed, which makes the game very difficult and frustrating.

Just as Nancy regains complete control of her turret, a Weather Hazard starts to affect the entire system. Particles start moving in waves across the screen, making them harder to predict and capture.

An image begins to appear behind the particles and the final countdown begins. The Blue team pulls a last minute win because they manage to capture a lot of high-scoring large particles by working together.

A figure appears from behind the screen, revealing a photo of a guy's umbrella being pulled away by a large gust of wind. The group cheers and is anxious to play again.

Time Based Flow: SnB (Demo Edition)
Pre-Game 1. iPod Touches are placed face up on a table with the SnB app pre-loaded. The "Turret Map" symbols are reflected onto the floor using gobos. The large display shows the SnB logo.

2. The players pick up an IPOD™ and walk to the corresponding spot on the floor. When they are in the correct space, they hit "ready" on the IPOD™ screen.

3. Once the final player hits "ready," the large display zooms into the globe at the center of the logo and all of the turrets appear on the display. The players are able to move their turret on the large display. There are no particles present during this period, so the player simply learns how to spin the turret and has an opportunity to strategize with other team members. Additionally, instructional text and a 20 second countdown are at the center of the large display. During the last 5 seconds of the countdown, each team is individually highlighted using lighting effects.

The instructional text at the center of the large display is, "Tilt your controller to move your turret. The team with the highest score wins the game—each particle type is described on your iPod!"

The instructional text disappears when the particles begin to fill the large display.

Stage 1

4. On completion of the countdown, particles begin appearing on the large display and Stage 1 is triggered. There are 4 "stages" to the game that go back to back without interruption.

5. Stage 1 consists entirely of positive particles. The players can adjust the strength of their suction power and use a blow "pulse" as needed (although it will not be necessary during Stage 1). As the players suck up positive particles, the LED below the large display shows the team score as a "tug of war" style color band. The turrets also display each player's score as the game progresses.

Stage 2

6. Stage 2 begins roughly 1 minute after the beginning of the game. The lighting and sound in the space shift to signal a mood change and negative particles are introduced.

Stage 3

7. Stage 3 begins a minute after the beginning of Stage 2. Hazards are slowly introduced into the system in the following order: Point Loss, Power Decrease, and Nozzle Block (push only). Each hazard looks different and is explained in the center column on the iPod. The lighting and sound in the space shift to signal a mood change.

Stage 4

8. Stage 4, the final stage, begins a minute after the beginning of Stage 3. This stage has two parts. The first part of Stage 4 introduces global hazards such as wind. 30 seconds into Stage 4 triggers the finale, wherein no new particles are introduced into the system. Each change is signalled using a lighting and sound shift.

Additional aspects are described herein.

In one embodiment, the games are "hosted" by a host machine that communicates with the different features which form parts of the game. These different features include all the parts described above, and those described herein including the mobile controller connections. In one embodiment, this is formed by a Mac Pro™ computer with the following technical specifications, with 3.5 GHz 6core; 12 MB of L3 cache; 16 GB (4×4 GB) of 1866 MHz DDR3 ECC; 1 TB PCIebased flash storage; ● Dual AMD™ FirePro D700 GPUs with 6 GB of GDDR5 VRAM each. This host machine runs all the software necessary for the Unity3D games to support 30+ simultaneous mobile controller connections with low latency and high bandwidth communication.

The system supports a sustained throughput of at least 900 kbps of message data and a sustained message processing throughput of 1200 messages per second without having a major impact on CPU load. That means that additional processing power is dedicated to the Unity3D game logic even when the messages are being processed as described herein.

The host system is configured using a game development kit, described herein. The game development kit operates by simulating the multiple controllers to which the system communicates. These simulations use iOS™ portable devices with iOS™ installed, e.g., an iPod touch™ or iPhone™.

The host system launches games using a game launcher which acts as a host application for the currently running game. The host system handles various functions for the game including drawing content even when a game is not running and it also starts and stops games in response to controls from a game administrator.

The game administrator or "docent", has control over the game playback. That control is carried out from the portable device that is configured or enabled to be the docent. The docent controller can therefore be one of the portable clients. This client can control when games begin and can choose the next game to execute. In one embodiment, however, the games execute automatically.

The game launcher identifies games installed on the computer using a product name unique identifier. When the game launcher receives a message from the docent application, it performs its own housekeeping and then transmits the necessary information to the currently running game, or to a new game, if the transmit is after the game has been started. However, starting up a game program is distinct from starting the game (with the first round) once all the controllers are connected. Note: the docent controller never interacts with the regular controller applications in an embodiment.

When a game is over, the Slideshow Interstitial launches a slideshow, using the LauncherSlideshow class is used in conjunction with the LauncherConnection class to display a slideshow of full screen images and movies in between games. The LauncherSlideshow can be used to display advertisements and other marketing assets. This LauncherSlideshow class uses images and videos that are stored in the local machine located in the EscLauncher/Slideshow folder. The class defaults to rotate through the images/movies every 10 seconds in alphanumeric order. These default settings can be changed, e.g., using the SlideshowLauncher::SetBackgroundImageRefreshTime( ) method to set a rotation time or other parameters.

The game launcher serves as an intermediate screen in between games. The EscDocent controller launches games on command during the playing of this content. If a game is launched while a movie is playing, the movie sound fades away and the movie is stopped.

After the game ends, the launcher starts showing the next item on the queue.

The docent, the "EscDocent" is a native iOS app that operates to launch/quit games from the EscLauncher. When the docent app is first launched, it will show if it is connected to the server, e.g., via an indication of Connected/Not Connected. If connected to the ESC game server, the docent can launch and control the games.

The EscDocent app contains two views: the main view and a detailed view. The main view shows a list of all the games that are currently available on the local system located in the folder ~/escgames. The detailed view allows the docent to start/stop a game and to apply custom settings.

The main view shows a table list of available games. These available games can be selected by tapping on them, which will show a prompt to load the game. If OK is selected, the app loads the game. The detailed view shows a spinning loading indicator until it receives a game loaded message from the game. This happens once a game has loaded and is connected to the server. The detailed view contains both the Settings and Advanced Settings. Settings provide basic functionality such as starting and stopping a game, while Advanced Settings allow more customization of a game.

Settings comes with a number of basic options to select the Round and Difficulty.
Round: 1, 2, 3, 4, 5
Difficulty: Easiest, Easy, Medium, Hard, Hardest
START: Start the game.
PAUSE: Pause the game
STOP: Stop the game (ie stop the current round)
NEXT: Go to the next screen. (ie skip the instructions)
QUIT: Quit the game Once options are set, START is selected to start the game. This will tell the game the options that were selected. Once the game is started, the docent can also select PAUSE or STOP.

At any point in a game, any number of NEXT messages can be sent. The game developer can use this message to do a number of things like skip instructions or to send in a special enemy or character into the game.

The game can also be QUIT the game at any time and returned to the normal view with a game selection.

Prior to a game starting, the administrator can select the round and difficulty. Once the START button is pressed, these options will be inactive until the administrator STOPs the game.

After scrolling down from the Settings view, there is an Advanced Settings view to select a number of customizable parameters to apply to the game.

Advanced Settings comes with two sets of options: Mode and Parameter. If the game is set up to handle these extra options, then the administrator can use the Docent Controller to set these advanced settings. It is up to the game developer to decide how the mode/parameter values apply to the game.

In one embodiment, there are 3 modes and each mode allows you to select from 3 button choices. The mode values range from 0-2. There may also be 3 parameters with text fields that allow entry of custom strings.

If a game developer chooses to set default advanced settings parameters, the docent parameter text fields are preloaded with the custom text from the game.

A game developer may also set up default parameter strings that the Docent controller displays by using the method SubmitParameterStrings ( ) from Server Connection. The controller may set up to 3 parameter strings. At any point in the game, the user can select APPLY to send the advanced settings to the game engine.

When games are updated on the local game engine server (880 in FIG. 8), the game launcher (1210 in FIG. 12) sends a message to the docent controller (1200 in FIG. 12) to update the list of available games in the main view. The EscDocent gets the new list of games when it is connected to the game server and is active.

The EscShowControlInterface abstracts messages that are used to customize live lighting effects during gameplay. Lighting effects are based on the number of teams in play and variables such as color, duration and pattern can be customized.

Lighting controls can be set using a show control interface:
Lighting color for teams
Lighting accents
Lighting wash
A highlight for an individual player
Ambient lighting
Fans
Strobes
Atmosphere
Preprogrammed Lighting events
System setup The EscAnalytics class is a singleton that is the primary interface for tracking gameplay and player activity utilizing Google Analytics 811 (GA). EscAnalytics allows the game developer to track game activity through events. It also allows the game developer to track player activity like player points awarded or the winning player as well. However any events can be tracked as desired.

The system also supports integration with Google Analytics. In Google Analytics ("GA"), all tracking is performed in the game logic which means that it is invoked through the Mac Pro gaming system. Each time a game is launched, a new session is started. During a session, a game developer can invoke tracking calls that result in GA events being tracked.

All GA events have a Category, Action, and Label. The Category is always the location of the Mac Pro unit. The Action is the name of the game and the event that is being tracked. The Label is the number of players currently experiencing the event. Each one of these metrics can be searched, sorted, or filtered. A timestamp is automatically recorded with the event; so the event can be seen in real time or viewed after the fact across any time period, at multiple scales (days, weeks, months).

In one embodiment, the functions and processes can be monitored using Google analytics. For example, this can tell the user how much processing power has been used, how many times a game has been played, and other information about the game.

In order to be sure that games can be remotely deployed to the system, a game management system is used. The Game Management is carried out using a Game deployment system that uses an AWS S3 bucket 812, logic that runs on the Mac Pro gaming machines 880, and a controller app deployment using Meraki.

Remote Game Deployment is carried out by using new and updated games that are zipped and uploaded to the S3 bucket 812 in Amazon Web Services; however of course other comparable buckets of this type can be used. Credentials are provided to log in to the AWS Console and upload the games. Each game is uniquely named when it is compiled into OSX app (for example, escduckhunt.app). Afterwards, the new or updated game is archived as a .zip file with an underscore and eight digit date (as MMDDYYYY) appended to the file name, for example, escduckhunt_06152014. zip. Zip files are named in this way for the sync script to function as expected. Only one copy of each game should exist in the S3 bucket at any given time. Once in the bucket 812, the games are synchronized down to the individual machines.

Syncing is performed automatically via a script which runs nightly at 4 AM EST provided the game server has a working connection to the Internet and the escuser is logged in. Any files that have not been downloaded to the game server are downloaded in addition to any files that have changed since the last sync. Any newly downloaded files will be unzipped and replace existing games on the gameserver. Any games that do not exist in S3 are deleted from the game server's game directory.

One embodiment of the system described above uses the hardware system described and shown in FIG. 8 along with the software system shown and described with reference to FIG. 9. In this system, the local network 800 may be the device that is playing the game. This connects via network 805 to Internet repositories 810 which can include, as described above Google analytics 811 and the S3 bucket 812. This also connects via local network 815 to wireless network structures shown generically as 820 and 825 which may include the game management. The configuration is received from the Internet 830.

The local network itself includes the unity game engine 850 shown in further detail as 851 which includes the game UI and event management, as well as the run time bridge and communication middleware. The game engine connects to the wireless, connects to a game engine service 880, connects to projectors 855 that produce the output, and also projects to a supernode 860 which controls the lighting system 861. This also connects to the audio system 862 via MIDI.

In FIG. 9, the main system 900 is shown connected to a single remote system 910 here an iPod touch™. However, it should be understood that many different remote systems can be connected to the single main system 900. As described above, the main system 900 includes the game launcher 920, connected to the game itself 921 as a compiled game. This may be connected via XMPP. In addition, each of these are controlled by the control structures, a media sync script 925, game sync script, game registration script, keep alive shell, as well as locations of the credentials keys and analytics.

The local routing system can use DNS and bonjour. The messaging architecture can use ejabberd/XMPP.

Using this system, The ESC gaming platform supports between 30 and 50 gamers playing together on a single canvas using commodity mobile devices and computing hardware.

The Communication Subsystem is an abstraction layer that uses both TCP and UDP as an abstraction layer that sits between the iOS devices and the Mac Pro that runs the games. It mediates all communication using both TCP and UDP protocols. TCP socket connections provide reliable and robust message transmission that will arrive in the same order that it was sent. TCP communication is ideal for data transfer that must be guaranteed. The downside to using TCP sockets is that they can demonstrate higher latency than UDP communication. Conversely, UDP communication is connectionless and thus may be less reliable. This is especially true when experiencing signal interference and noise which is more common on wireless networks. UDP messaging delivers messages with lower latency.

The ESC event synchronization provides high throughput performance and low latency by utilizing each protocol for what it is best suited for. The game developer selects the right method of communication. This is done by selecting to send events or states.

An event provides communication that is guaranteed to be received and in the order that the events were dispatched.

A state is a list of variables that can be defined and changed at any time but are transmitted asynchronously and only when needed.

All TCPbased communication that happens between the mobile devices and the desktop is established using EscEvent instances. Every EscEvent is composed of a name and a list of keyvalues pairs. Both of these properties are public on EscEvent instances. An EscEvent is serialized to a string literal with the format, "name:key1=value2, key2=value2, key3=value3".

All UDPbased communication that happens between the mobile devices and the desktop is established using a state variable dictionary. Each Client instance stores a state dictionary that it transmits to the game automatically. This is done using the ClientSetStateVar method. This state information is transmitted during the next Unity update step. However, a game developer can override this update frequency using the ClientConnection SetStateUpdateFrequency method. This method takes an integer that represents how many times per second the state updates are synchronized. This frequency cannot be set to less than once per second.

Choosing Between State Updates and Game Events is necessary to efficiently send data between controllers and the game. This requires some consideration from the game developer. When implementing communication game logic, a simple way to choose between events and state updates is to consider the following question, "is it okay if this information is never received?" If so, use state updates. Otherwise use EscEvents. An example of data that can be dropped without great consequence is the iOS accelerometer data. The accelerometer data is changing constantly and if a state update is lost then the game will simply receive the next one without anyone noticing. However, a message to start the game cannot be lost in this way because if it was then a controller would not be notified that the game had begun.

The gameplay format is carried out by each game as follows:
1. Players hold a controller and wait to join the game
2. The controller connects to the game and notifies the player
3. The game waits for acknowledgement from the player
4. Using the controller, the player indicates they are ready and join the game
5. The game waits for remaining players to join
6. The game starts
7. The first round starts
8. The first round ends
9. The Nth round starts
10. The Nth round ends
11. The game ends Each one of the above stages is initiated via an EscEvent. Notifications for these stages are exposed to game developers as callbacks. Each callback allows the game developer to a chance to change the state and appearance of the game as needed.

Creating a Controller Application is carried out to get a Controller Connected to the Game. The ClientConnection interfaces with the game. The ClientConnection class acts as an abstraction layer for the networking interface. This is done when the controller and the game are connected to the same network.

The game operates by sending initialization information to the controller. This information can include team information, voting information, or simply an opportunity for the user to indicate that they are ready to join the game. This event should normally be the first one received by the client and named "init" and include any special parameters required for the game. These parameters are defined by the game developer and thus they are optional.

Sending this EscEvent from the Controller application is required for the game to function properly. After processing the init event, the client must respond to the game after a user has provided feedback for the init event. The response event name must also be "init" and be sent directly to the game using the DispatchEventToClient method. The following is a simple example:

```
// sending a message to the game server
ClientConnection connection = ClientConnection.Instance;
connection.DispatchEventToClient(new EscEvent("init"),
  connection.server);
```

Each EscEvent that is sent to the server can include an optional list of keyvalue pairs. The following is an example for this functionality:

```
// Sending an event from the client to the game
ClientConnection connection = ClientConnection.Instance;
Dictionary<string, string> properties = new Dictionary<string, string>( );
properties.Add("key", "value");
// create special EscEvent
EscEvent specialEvent = new EscEvent("special", properties);
// Send the event the game
connection.DispatchEventToClient(initEvent, connection.server);
Processing Events from the Game
```

As the game runs, the game will periodically send new information to the controller. Events with the following names are sent for all games:
gameStart
roundStart
roundEnd
gameEnd However, it is up to the game designers to create any special events they need which will be handled by the controller that goes with the game. All of these events should be processed in the MonoBehavior Update method. All events come from the game which stores the events until they are processed by the controller application. The following is an example of how this would normally be done:

```
// processing messages from the game
ClientConnection connection = ClientConnection.Instance;
if (connection.IsConnected( )) {
  if (connection.server.HasMoreEvents( )) {
    EscEvent evt = connection.server.GetNextEvent( );
    if (evt.name == "some special string") {
      // do something with event...
    }
  }
}
```

Available Callbacks for Clientconnection include the following:
OnConnected—invoked when it has established a connection with the game
OnRegistered—invoked when it has registered itself with the game
OnInitialized—invoked when it has received the init event from the game
OnDisconnected—invoked if something causes the client to disconnect from the game
OnHandlePresence—invoked when the game is detected Creating a Game Application is carried out as follows. Creating a new game requires using the ServerConnection to interface with the controllers. The ServerConnection class acts as an abstraction layer for the networking interface. A server interface is created for the game. Its best to call this in the MonoBehavior Awake method invoked by the Unity runtime.

After starting the game, the ServerConnection IsConnected method is used to determine if the connection has been successfully opened. There is also the OnConnected callback that the instance invokes when the connection is made. It is invoked once IsConnected will return true.

A connected controller waits for a special "init" event. This event is designed to provide an opportunity for the game designer to submit special game info to the controllers that attempt to join it. This data can be anything stored as a list of keyvalue pairs. The following is an example of such an operation:

```
// initialize a controller that has just been registered
ServerConnection connection = ServerConnection.Instance;
Dictionary<string, string> initPayload = new Dictionary<string, string>( );
initPayload.Add("team1", "defensive");
initPayload.Add("team2", "offensive");
// upon registration send init event
serverConnection.InitializeController(client, initPayload);
```

The game starts by sending one of these initialization events; and after the game is running, the controllers submits events to the game. These events get stored in each client object within the ServerConnection.clients list until they are processed by the game. The system checks for state changes that the clients have submitted. The Client.GetStateVar method is to read the latest state information. Consider the following example code:

```
// processing messages from controllers
ServerConnection connection = ServerConnection.Instance;
if (connection.IsConnected( )) {
  foreach (Client client in connection.clients) {
    while (client.HasMoreEvents( )) {
      EscEvent evt = client.GetNextEvent( );
      if (evt.name == "some special event name") {
        // do something with event...
      }
    }
    // collect controller state information
    object stateUpdate = client.GetStateVar("somestatevariable");
  }
}
```

Note that state value changes and events are independent of one another. A client might have no more events to process and still have state changes that can be processed.

To send events to the client, a process ServerConnection.DispatchEventToClient is used to supply the EscEvent and the Client instance that will receive and process the event.

The following is a list of all the callback actions that the ServerConnection class provides:

OnConnected—invoked when the game has opened the connection

OnClientConnected—invoked when a new client has connected to the game

OnClientRegistered—invoked when a new client is registered with the game

OnClientDisconnected—invoked when a client has disconnected from the game

OnClientInitialized—invoked when a client has become initialized with the game

OnGameStart—invoked when the game launcher starts the game

OnGamePause—invoked when the game launcher pauses the game

OnGameEnd—invoked when the game launcher ends the game

OnParametersUpdated—invoked when the game receives updated parameters from a docent remote control OnNextScreen—invoked when the game receives a "next" button press Games are preferably team games, e.g., the players are broken up into teams. The creation of teams has a major impact on how the onsite lighting and effects are controlled. There are distinct options for creating team games including One team (every person for themselves), or 26 competitive teams, or other options discussed herein. The lighting system interfaces with the teams. However, the lighting system only needs to be controlled based on which players belong to each team. This information is needed in order to highlight the lead or other player. The initiation process for all team games should follow these steps:
1. Determine the number of teams
2. Gather or assign the player's position and associate that number with that client
3. Invoke lighting commands using the associated player number.

Each person entering the room will either be given or choose a spot in front of the screen. Each spot is indicated by a number on the floor. One such layout is shown in FIG. 10 which shows the player layout locations 1 through 30. Each player is assigned with one of those locations, either by pre-assignment, or by the player standing in that location. The game itself can either tell the player where to stand or ask the player (by a message to their controller) which spot they are standing on. This number then forms an index that must be used by the game to group that player into the right team and to highlight them in the future. The team that the player is on is based upon their position and the total number of teams. FIG. 11 shows different team layouts which can be accommodated when the system is telling the users where to stand. For example, 1100 shows a team layout for use with a game with 6 teams, 1105 with 5 teams 1110 for 4 teams, 1115 for 3 teams, 1120 for 2 teams, and 1125, for games without teams. Each of these layouts includes the locations 1-30. Of course, other layouts can be used, but these are exemplary.

The EscShowControlInterface abstracts messages that are used to customize live lighting effects during gameplay to interface and communicate with the lights to sending individual lighting effects to the areas. Lighting effects are based on the number of teams in play and variables such as color, duration and pattern can be customized.

Once an instance of the Esc Show Control Interface is created, calls to unity are made to customize the available lighting control methods at defined moments.

Calls to Unity can use the following format

```
//! Set total available teams, must be <= 6
SelectTeamLightingMode (uint teamValue)
//! Highlight individual player for a given duration
HighlightPlayer (uint player, Duration duration)
//! Specify lighting color and duration for a specific team
SetLightingForTeam (uint team, LightingColor color, uint timing)
//! Specify lighting accent color and duration
SetLightingAccents (LightingColor color, Timing timing)
//! Specify lighting wash
SetLightingWash (LightingColor color, Timing timing)
//! Specify lighting wash pulse
SetLightingPulse (Pulse pulse)
//! Specify lighting ambient color and duration
SetAmbientLighting(LightingColor color, Timing timing)
//! Specify lighting fan group and speed
SetFans (Grouping groupValue, Speed speedValue)
//! Specify lighting strobes with a moving pattern
SetStrobes (Grouping groupValue, Pattern patternValue)
//! Invokes a generic show control event with the given cue number.
The cue number must be between 0.01 and 9999.99
InvokeLightingCue (uint cueEvent, uint cueVariant)
//! Total teams in play
Teams:
Teams.NO_TEAMS = 0,
Teams.ONE_TEAM,
Teams.TWO_TEAMS,
Teams.THREE_TEAMS,
Teams.FOUR_TEAMS,
Teams.FIVE_TEAMS,
Teams.SIX_TEAMS
//! Available overhead lighting that is based on total teams in play
//! Available lighting colors
LightingColor:
LightingColor.RED,
LightingColor.ORANGE,
LightingColor.AMBER,
LightingColor.YELLOW,
LightingColor.GREEN,
LightingColor.CYAN,
LightingColor.BLUE,
LightingColor.LIGHT_BLUE,
LightingColor.MAGENTA,
LightingColor.LAVENDER,
LightingColor.PINK,
LightingColor.WARM_WHITE,
LightingColor.NEUTRAL_WHITE,
```

```
LightingColor.COOL_WHITE,
LightingColor.BLACK,
LightingColor.RED_AMBER_YELLOW,
LightingColor.BLUE_CYAN_GREEN,
LightingColor.RED_BLUE,
LightingColor.AMBER_BLUE,
LightingColor.RED_WHITE_BLUE,
LightingColor.RED_PINK_PURPLE
// Available light groupings
Grouping:
Grouping.ALL,
Grouping.FRONT,
Grouping.BACK
//! Available intensity levels
Level:
Level.OFF,
Level.LOW,,
Level.MEDIUM,
Level.HIGH
//! Available speed
Speed:
Speed.OFF,
Speed.LOW,
Speed.MEDIUM,
Speed.HIGH
//! Available duration
Duration:
Duration.SHORT,
Duration.MEDIUM,
Duration.LONG
//! Available movement pattern
Pattern:
Pattern.LEFTRIGHT,
Pattern.RIGHTLEFT,
Pattern.CLOCKWISE,
Pattern.COUNTERCLOCKWISE,
Pattern.RANDOM1,
Pattern.RANDOM2,
Pattern.ONE_BURST,
Pattern.PAPARAZZI
// Available pulse patterns
Pulse:
Pulse.ALL_FULL,
Pulse.ALL_50_PERCENT,
Pulse.ALL_25_PERCENT,
Pulse.LEFT_RIGHT,
Pulse.RIGHT_LEFT,
Pulse.CENTER_OUT
// Available timings
Timing:
Timing.ZERO,
Timing.ONE,
Timing.THREE,
Timing.FIVE,
Timing.TEN
// Available Cue Events
Cue Events:
ShowControlInterface.CUE_WALK_IN,
ShowControlInterface.CUE_GAME_LAUNCH,
ShowControlInterface.CUE_FIND_LOCATION,
ShowControlInterface.CUE_IDENTIFY_TEAMS,
ShowControlInterface.CUE_TRAINING_MODE,
ShowControlInterface.CUE_GAME_START,
ShowControlInterface.CUE_TENSION_SLOW,
ShowControlInterface.CUE_TENSION_MEDIUM,
ShowControlInterface.CUE_TENSION_FAST,
ShowControlInterface.CUE_TENSION_NONE,
ShowControlInterface.CUE_END_ROUND,
ShowControlInterface.CUE_INTERMISSION,
ShowControlInterface.CUE_ANNOUNCE_LEADING_TEAM,
ShowControlInterface.CUE_IDENTIFY_LEADING_PLAYER,
ShowControlInterface.CUE_GAME_FINALE
```

Here are some more Unity Examples:

```
// access show control interface
howControl = ShowControlInterface.Instance;
// set team mode to "no teams"
showControl.SelectTeamLightingMode(0);
// set team mode to "4 teams"
showControl.SelectTeamLightingMode(4);
// set team mode to "2 teams"
showControl.SelectTeamLightingMode(2);
// highlight player 2 for a short duration
showControl.HighlightPlayer(2,Duration.SHORT);
// set lighting for team 2 to red over three seconds
showControl.SetLightingForTeam(2, LightingColor.RED,
    Timing.THREE);
// set lighting accents to green over three second
showControl.SetLightingAccents(LightingColor.GREEN,
    Timing.THREE);
// set lighting wash color to cyan over three seconds
showControl.SetLightingWash(LightingColor.CYAN, Timing.THREE);
// set ambient lighting to cyan over ten seconds
SetLightingPulse(Pulse.ALL_FULL);
// set ambient lighting to cyan over three seconds
showControl.SetAmbientLighting(LightingColor.CYAN,
    Timing.THREE);
// set all fans to medium speed
showControl.SetFans(Grouping.ALL, Speed.MEDIUM);
// set strobe lights for the front to run clockwise
showControl.SetStrobes(Grouping.FRONT, Pattern.CLOCKWISE);
```

The cues are defined as a special address endpoint combined with a payload of numbers that is sent as a UDP packet (formatted as OSC). This allows cues to be constructed from method calls where a developer supplies parameters that determine which exact cue will be sent. The OSC messages are sent over a physical link between the Mac Pro 830 and the PRG node 860 (via the Cisco switch 820) which provides a robust channel of communication.

Extensibility for the lighting system can be provided. For lighting events, any arbitrary floating point number can be supplied (even if not yet bound to anything). Extensibility could use programming by Full Flood).

Another way to provide extensibility is to add new parameters to the ShowControlInterface class which is part of the Unity codebase for ESC. This also puts those changes in the programming of the PRG lighting software or hardware.

Move this to the analysitcs above.

The analytics track events, including:
game load
game start
game end
game pause
round start
round end
controller joins game
controller leaves game FIG. 12 shows an overall flow diagram between the different modules FIG. 12 shows at the top the docent 1200, forming a layer that communicates with the game launcher 1210, that communicates with the game server 1215 that communicates with the multiple different client applications. The docent interacts with a number of games shown at 1201, each of which has a title and ID. In order to start a game, at 1202, the docent creates a command using the game ID sent to the game launcher with the option to load. At 1211, the game launcher creates a quit game command including the game ID to start the operation. This causes the game server to end any current game at 1216, which is which command is sent to the client apps. The client apps return to their home controller scene at 1221 in preparation for a new game.

The game server sends at 1217 and 1218 commands to all the different registered addresses to load the controller scene for the new game at 1222.

At 1203, after giving time for all this to occur, the command for the game is started. This then sends the game ID to start the command at 1212, which causes a game start command to be sent at 1219. This starts the round at 1230 with the new game.

The docent application can also cause the game to pause 1204, which sends a command to pause the game at 1213, causing the game pause command at 1231 sent to all the registered controllers. This may cause the round 2 at 1232 at which time all the developer events are sent at 1233 both to the clients and from the clients.

The game can also be ended at 1205 by the docent at which causes the game launcher to send a quit game command at 1214, causing the game to end at 1235. Again, this causes the controllers to each return to their home controller scene at 1223.

Although only a few embodiments have been disclosed in detail above, other embodiments are possible and the inventors intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, other kinds of games can use the techniques described herein, and other objects can be controlled in this way.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments.

The various illustrative logical blocks, modules, and circuits described in connection with the embodiments disclosed herein, may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. The processor can be part of a computer system that also has a user interface port that communicates with a user interface, and which receives commands entered by a user, has at least one memory (e.g., hard drive or other comparable storage, and random access memory) that stores electronic information including a program that operates under control of the processor and with communication via the user interface port, and a video output that produces its output via any kind of video output format, e.g., VGA, DVI, HDMI, displayport, or any other form. This may include laptop or desktop computers, and may also include portable computers, including cell phones, tablets such as the IPAD™, and all other kinds of computers and computing platforms.

A processor may also be implemented as a combination of computing devices, e.g., a combination of a DSP and a microprocessor, a plurality of microprocessors, one or more microprocessors in conjunction with a DSP core, or any other such configuration. These devices may also be used to select values for devices as described herein.

The steps of a method or algorithm described in connection with the embodiments disclosed herein may be embodied directly in hardware, in a software module executed by a processor, using cloud computing, or in combinations. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of tangible storage medium that stores tangible, non transitory computer based instructions. An exemplary storage medium is coupled to the processor such that the processor can read information from, and write information to, the storage medium. In the alternative, the storage medium may be integral to the processor. The processor and the storage medium may reside in reconfigurable logic of any type.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer.

The memory storage can also be rotating magnetic hard disk drives, optical disk drives, or flash memory based storage drives or other such solid state, magnetic, or optical storage devices. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. The computer readable media can be an article comprising a machine-readable non-transitory tangible medium embodying information indicative of instructions that when performed by one or more machines result in computer implemented operations comprising the actions described throughout this specification.

Operations as described herein can be carried out on or over a website. The website can be operated on a server computer, or operated locally, e.g., by being downloaded to the client computer, or operated via a server farm. The website can be accessed over a mobile phone or a PDA, or on any other client. The website can use HTML code in any form, e.g., MHTML, or XML, and via any form such as cascading style sheets ("CSS") or other.

Also, the inventor(s) intend that only those claims which use the words "means for" are intended to be interpreted under 35 USC 112, sixth paragraph. Moreover, no limitations from the specification are intended to be read into any claims, unless those limitations are expressly included in the claims. The computers described herein may be any kind of computer, either general purpose, or some specific purpose computer such as a workstation. The programs may be written in C, or Java, Brew or any other programming language. The programs may be resident on a storage medium, e.g., magnetic or optical, e.g. the computer hard drive, a removable disk or media such as a memory stick or SD media, or other removable medium. The programs may also be run over a network, for example, with a server or other machine sending signals to the local machine, which allows the local machine to carry out the operations described herein.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An interactive game system, comprising:
   a gaming computer that runs a gaming system software that communicates with multiple remote controllers to send information to said each of said controllers indicating events in a game being run by the gaming system software, and to receive information from each of the multiple remote controllers indicating player actions that have occurred in the game;
   wherein one of said remote controllers is a docent controller that controls aspects of the game, and the gaming computer identifies the docent controller by recognizing a docent application running on the docent controller, and the gaming computer operating to receive game controlling information from the docent controller;
   wherein said gaming computer identifies said multiple remote controllers, and sends and receives game information to each of said multiple remote controllers including said docent controller, and where different controllers are sent different information about the game that are individualized to each controller;
   and where the gaming computer receives control information from the docent controller controlling playing of at least one game, said control information including at least information controlling an initiation of the at least one game to start executing, and operates the game based on the information received, and the gaming computer does not receive said control information from the other remote controllers other than the docent controller.

2. The system as in claim 1, wherein the control information received from the docent controller also includes selection of one of multiple different games to execute, and the game computer executes the game selected by the docent controller.

3. The system as in claim 2, wherein the gaming computer plays an intermediate screen in between games, and receives said control information from the docent controller to select said next game to play during the playing of the intermediate screen.

4. The system as in claim 3, wherein the intermediate screen is a movie, and the gaming computer fades out the intermediate screen when said control information to start the game is received from the docent.

5. The system as in claim 1, wherein the control information received from the docent controller includes selection of a difficulty level of the game to play, where said games have multiple difficulty levels, the gaming computer sets the difficulty level information received from the docent controller, but does not set a difficulty level based on any information received any other controller other than the docent controller.

6. The system as in claim 1, wherein the control information received from the docent controller includes a command to send a special character into the game.

7. The system as in claim 1, further comprising the game computer having programming that detects that a number of games which can be played has been updated on the gaming computer, and sending a message to the docent controller to update the games that can be selected for play by the docent controller.

8. The system as in claim 1, wherein the control information received from the docent controller includes a command to customize a playing of the game.

9. The game system as in claim 1, wherein the computer detects locations of the controllers, and sends information to each of a plurality of lighting devices to provide lighting effects which are specific to the locations of the controllers.

10. An portable computer for playing a game, comprising:
    a portable computer with a processor, a screen, and a wireless network system, said portable computer receiving information from a remote gaming system that is running a game, where said information includes actions in the game that are specific to said portable computer as one client running the game, including events in the game being run by the gaming system,
    said portable computer also running a docent controller application for the game, which controls the game for other controllers,
    where said docent controller application includes a list of games which are available for play on the remote gaming system, and includes a control to start and stop each of the plurality of games and also includes a control to customize the games;
    where said docent controller application receives information about the list of games, when the list of games is updated on the remote gaming system.

11. The portable gaming system as in claim 10, wherein the control to customize the games includes selection of a difficulty level of the game to play, where said games have multiple difficulty levels.

12. The portable gaming system as in claim 10, wherein the control to customize the games includes a command to send a special character into the game.

13. A method of running an interactive game, comprising:
running a game on a gaming computer that communicates with multiple remote controllers to send information to said each of said controllers indicating events in the game being run by the gaming computer;
receiving information in the gaming computer from each of the multiple remote controllers, said information indicating player actions that have occurred in the game from each of the remote controllers;
identifying the docent controller in the gaming computer by recognizing a docent application running on the docent controller, and the gaming computer receiving game control information from the docent controller that controls aspects of the game, where the docent controller also is sent game information and plays in the game;
sending game information to and receiving game information from each of said multiple remote controllers including said docent controller, and where different controllers are sent different information about the game that are individualized to each controller; and
receiving control information from the docent controller controlling playing of at least one game, and operating the game based on the information received, and not receiving control information from the other remote controllers other than the docent controller,
where said control information received from the docent controller includes at least information controlling an initiation of the at least one game to start executing, and operating in the gaming computer to initiate the at least one game responsive to receiving the information from the docent controller, but not initiating the game responsive to receiving information from any controller other than the docent controller.

14. The method as in claim 13, wherein the control information received from the docent controller includes selection of one of multiple different games to execute and executing, in the game controller, the game selected by the docent controller.

15. The method as in claim 14, further comprising playing an intermediate screen in between games, and receiving said control information from the docent controller to select said next game to play during the playing of the intermediate screen.

16. The method as in claim 15, wherein the intermediate screen is a movie, which fades out when the game is launched based on control by the docent controller.

17. The method as in claim 13, wherein the control information received from the docent controller includes selection of a difficulty level of the game to play, where said games have multiple difficulty levels.

18. The method as in claim 13, wherein the control information received from the docent controller includes a command to send a special character into the game.

19. The method as in claim 13, further comprising detecting that a number of games which can be played has been updated on the gaming computer, and sending a message to the docent controller with information to update the games that can be selected for play by the docent controller.

20. The method as in claim 13, wherein the control information received from the docent controller includes a command to customize a playing of the game.

21. The method as in claim 13, further comprising detecting locations of the controllers, and sending information to each of a plurality of remotely located overhead mounted lighting devices to provide lighting effects which are specific to the locations of the controllers.

* * * * *